US010521500B2

(12) United States Patent
Emori

(10) Patent No.: US 10,521,500 B2
(45) Date of Patent: Dec. 31, 2019

(54) IMAGE PROCESSING DEVICE AND IMAGE PROCESSING METHOD FOR CREATING A PDF FILE INCLUDING STROKE DATA IN A TEXT FORMAT

(71) Applicant: RICOH COMPANY, Ltd., Ohta-Ku (JP)

(72) Inventor: Mototsugu Emori, Saitama (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/596,436

(22) Filed: May 16, 2017

(65) Prior Publication Data

US 2017/0249294 A1 Aug. 31, 2017

Related U.S. Application Data

(63) Continuation of application No. PCT/JP2015/005917, filed on Nov. 27, 2015.

(30) Foreign Application Priority Data

Dec. 1, 2014 (JP) ................................ 2014-243144

(51) Int. Cl.
*G06F 17/24* (2006.01)
*G06K 9/62* (2006.01)
(Continued)

(52) U.S. Cl.
CPC ........ *G06F 17/242* (2013.01); *G06F 3/04883* (2013.01); *G06F 17/214* (2013.01);
(Continued)

(58) Field of Classification Search
CPC ........................... G06F 17/2229; G06F 17/242
See application file for complete search history.

(56) References Cited

U.S. PATENT DOCUMENTS 8,806,354 B1 8/2014 Hyndman et al.
2005/0144622 A1* 6/2005 Ballinger .............. G06F 9/4493 719/315
(Continued)

FOREIGN PATENT DOCUMENTS

EP 2 650 767 A1 10/2013
JP 04-096883 3/1992
(Continued)

OTHER PUBLICATIONS

Adobe Creative Team, Adobe Acrobat XI Classroom in a Book, Nov. 2012, Adobe Press, pp. 1-45 (Year: 2012).*
(Continued)

*Primary Examiner* — Scott T Baderman
*Assistant Examiner* — Seung Woon Jung
(74) *Attorney, Agent, or Firm* — Xsensus LLP

(57) ABSTRACT

An image processing device includes a handwriting renderer, an image renderer, an external image renderer, a serializer, a creator, a recognizer, and a concatenation unit. The handwriting renderer is configured to render a stroke on a first layer. The image renderer is configured to render an image on a second layer lower than the first layer. The external image renderer is configured to render an external image on a third layer lower than the second layer. The serializer is configured to convert the stroke rendered on the first layer and the images rendered on the second and third layers into text data. The creator is configured to create document data corresponding to one page based on the text data. The recognizer is configured to acquire a character string from the stroke. The concatenation unit is configured to concatenate adjacent characters on the string with an unnecessary space therebetween being deleted.

20 Claims, 19 Drawing Sheets

(51) Int. Cl.

| | |
|---|---|
| ***G06T 11/60*** | (2006.01) |
| ***G06K 9/00*** | (2006.01) |
| ***H04N 1/387*** | (2006.01) |
| ***G06F 17/21*** | (2006.01) |
| ***G06T 11/20*** | (2006.01) |
| ***G06F 3/0488*** | (2013.01) |
| *G06F 3/14* | (2006.01) |

(52) U.S. Cl.
CPC ..... *G06K 9/00416* (2013.01); *G06K 9/00422* (2013.01); *G06K 9/62* (2013.01); *G06T 11/203* (2013.01); *G06T 11/60* (2013.01); *H04N 1/387* (2013.01); *G06F 3/1454* (2013.01); *G09G 2340/12* (2013.01)

(56) References Cited

U.S. PATENT DOCUMENTS

| | | | | |
|---|---|---|---|---|
| 2010/0262994 | A1* | 10/2010 | Kawano ............. | H04N 5/44543 725/39 |
| 2011/0175929 | A1 | 7/2011 | Tanaka | |
| 2012/0066213 | A1* | 3/2012 | Ohguro .................. | G06K 9/344 707/723 |
| 2012/0221944 | A1* | 8/2012 | Bloomfield ............ | G06Q 10/10 715/255 |
| 2014/0075302 | A1 | 3/2014 | Akashi | |
| 2014/0085669 | A1* | 3/2014 | Kashimoto ............... | G06F 3/14 358/1.15 |
| 2014/0304586 | A1* | 10/2014 | Hirabayashi ........ | G06F 17/2247 715/234 |
| 2015/0030249 | A1 | 1/2015 | Zhen et al. | |
| 2015/0091940 | A1 | 4/2015 | Emori et al. | |

FOREIGN PATENT DOCUMENTS

| | | | |
|---|---|---|---|
| JP | 11-327789 | | 11/1999 |
| JP | 2005-050051 | | 2/2005 |
| JP | 2011-145995 | | 7/2011 |
| JP | 2014-010568 | | 1/2014 |
| JP | 2014-052873 | | 3/2014 |
| JP | 2014-203249 | A | 10/2014 |
| JP | 2015-069284 | | 4/2015 |
| JP | 2015153352 | A * | 8/2015 |

OTHER PUBLICATIONS

Adobe Creative Team, Adobe Acrobat XI Classroom in a Book, Nov. 2012, Adobe Press, pp. 1-140 (Year: 2012).*

Extended European Search Report dated Dec. 20, 2017 in Patent Application No. 15864831.1, 9 pages.

Raid Saabni, "Efficient Recognition of Machine Printed Arabic Text Using Partial Segmentation and Hausdorff Distance", 6$^{th}$ International Conference of Soft Computing and Pattern Recognition (SOCPAR), XP032720302, 2014, pp. 284-289.

International Search Report dated Jan. 12, 2016 in PCT/JP2015/005917 filed on Nov. 27, 2015.

Written Opinion dated Jan. 12, 2016 in PCT/JP2015/005917 filed on Nov. 27, 2015.

Office Action dated Feb. 27, 2018 in Japanese Patent Application No. 2014-243144.

* cited by examiner

FIG.6

| PAGE DATA ID | START TIME | END TIME | STROKE ARRANGEMENT DATA ID | MEDIA DATA ID |
|---|---|---|---|---|
| p001 | 20130610102434 | 20130610102802 | st001 | m001 |
| p002 | 20130610102815 | 20130610103225 | st002 | m002 |
| p003 | 20130610103545 | 20130610104233 | st003 | m003 |
| ⋮ | ⋮ | ⋮ | ⋮ | ⋮ |

FIG.7 st001 st002 st003

| STROKE DATA ID | START TIME | END TIME | COLOR | WIDTH | COORDI-NATE ARRANGE-MENT DATA ID |
|---|---|---|---|---|---|
| s001 | 20130610102502 | 20130610102505 | ff0000 | 2 | c001 |
| s002 | 20130610102612 | 20130610102615 | 000ff0 | 3 | c002 |
| s003 | 20130610102704 | 20130610102712 | 0 | 1 | c003 |
| ⋮ | ⋮ | ⋮ | ⋮ | ⋮ | ⋮ |

| X-COORDINATE VALUE | Y-COORDINATE VALUE | TIME DIFFERENCE | WRITING PRESSURE |
|---|---|---|---|
| 10 | 10 | 100 | 255 |
| 12 | 10 | 200 | 255 |
| 14 | 12 | 300 | 255 |
| ⋮ | ⋮ | ⋮ | ⋮ |

FIG.9

| MEDIA DATA ID | DATA TYPE | RECORDING TIME | X-COORDINATE VALUE | Y-COORDINATE VALUE | WIDTH | HEIGHT | DATA |
|---|---|---|---|---|---|---|---|
| m001 | IMAGE | 20130610103432 | 0 | 0 | 1920 | 1080 | abc.jpg |
| m002 | IMAGE | 20130610105402 | 277 | 156 | 1366 | 768 | bcd.jpg |
| m003 | IMAGE | 20130610105017 | 277 | 156 | 1366 | 768 | cde.jpg |
| ⋮ | ⋮ | ⋮ | ⋮ | ⋮ | ⋮ | ⋮ | ⋮ |

FIG.10

| PRODUCT ID | LICENSE ID | EXPIRATION DATE |
|---|---|---|
| 1001 | 12345678abcdefgh | 2012/12/31 |
| 1001 | 4321dcba8765hgfe | - |
| . . . | . . . | . . . |

FIG.11

| NAME | EMAIL ADDRESS |
|---|---|
| TARO | taro@alpha.co.jp |
| HANAKO | hanako@beta.co.jp |
| - | jiro@gamma.co.jp |
| . . . | . . . |

FIG.12

| |
|---|
| iwb-20130610104423.pdf |
| iwb-20130625152245.pdf |
| iwb-20130628113418.pdf |
| ⋮ |

FIG.13

| NAME | IP ADDRESS |
|---|---|
| CONFERENCE ROOM 1 | 192.0.0.1 |
| CONFERENCE ROOM 2 | 192.0.0.2 |
| - | 192.0.0.3 |
| ⋮ | ⋮ |

FIG.14

| NAME | IP ADDRESS |
|---|---|
| CONFERENCE ROOM 1 | 192.0.0.1 |
| CONFERENCE ROOM 2 | 192.0.0.2 |
| - | 192.0.0.8 |
| ⋮ | ⋮ |

| SEQ | OPERATION NAME | SOURCE IP ADDRESS: PORT NUMBER | DESTINATION IP ADDRESS: PORT NUMBER | OPERATION TYPE | OPERATION TARGET (PAGE DATA ID/ STROKE DATA ID) | DATA |
|---|---|---|---|---|---|---|
| 1 | ADD | 192.0.0.1:50001 | 192.0.0.1:50000 | STROKE | p005 | ...... (STROKE DATA) |
| 2 | ADD | 192.0.0.1:50000 | 192.0.0.2:50001 | STROKE | p005 | ...... (STROKE DATA) |
| 3 | UPDATE | 192.0.0.2:50001 | 192.0.0.1:50000 | STROKE | p006 | (50, 40) |
| 4 | UPDATE | 192.0.0.1:50000 | 192.0.0.1:50001 | STROKE | p006 | (50, 40) |
| 5 | DELETE | 192.0.0.2:50001 | 192.0.0.1:50000 | STROKE | p007 | - |
| 6 | DELETE | 192.0.0.1:50000 | 192.0.0.1:50001 | STROKE | p007 | - |
| 7 | ADD | 192.0.0.1:50001 | 192.0.0.1:50000 | PAGE | - | - |
| 8 | ADD | 192.0.0.1:50000 | 192.0.0.2:50001 | PAGE | - | - |
| 9 | ADD | 192.0.0.2:50001 | 192.0.0.1:50000 | IMAGE | p006 | rico.jpg |
| 10 | ADD | 192.0.0.1:50000 | 192.0.0.1:50001 | IMAGE | p006 | rico.jpg |
| ⋮ | ⋮ | ⋮ | ⋮ | ⋮ | ⋮ | ⋮ |

IMAGE PROCESSING DEVICE AND IMAGE PROCESSING METHOD FOR CREATING A PDF FILE INCLUDING STROKE DATA IN A TEXT FORMAT

CROSS-REFERENCE TO RELATED APPLICATIONS

The present application is a continuation application of International Application No. PCT/JP2015/005917, filed Nov. 27, 2015, which claims priority to Japanese Patent Application No. 2014-243144, filed Dec. 1, 2014. The contents of these applications are incorporated herein by reference in their entirety.

BACKGROUND OF THE INVENTION

1. Field of the Invention

The present invention relates to an image processing device and an image processing method suitable for editing an emblem image rendered on an electronic whiteboard, and a computer-readable storage medium.

2. Description of the Related Art

In the related art, in a conference and the like in an enterprise, an educational institution, an administrative organ, and the like, utilized are electronic information boards by which a user can draw a stroke image such as a character, a numeral, and a figure on a background image, which is displayed on a large display.

When a personal computer is connected to such an electronic information board, a screen of the connected personal computer can be projected onto the electronic information board in a large size. Such an electronic information board is used for presentation in a conference in an enterprise or an administrative organ, or in an educational institution. Provided is (1) a function of operating a personal computer via a touch panel for operating the personal computer displaying the screen by directly touching the projected screen instead of a mouse operation using a touch panel function mounted on the electronic information board. Also provided is electronic whiteboard application software that operates on the connected personal computer together with such equipment. This application software provides (2) a handwriting function via a touch panel such as a function of providing a screen serving as a whiteboard and rendering a handwriting character and the like on the screen via a touch panel, and a function of taking in the screen of the personal computer to which the application is provided and superimposing a handwriting image thereon to be rendered.

By using such an electronic information board on which the handwriting function operates, the user can directly write matters pointed out and the like on the screen as appropriate while operating displayed material for explanation in a conference scene and the like in an office, and can record screen content including a written image as needed. As a result, when the conference is ended, it can be expected that a conclusion is efficiently obtained by reviewing and reusing the screen content.

Also developed is an electronic information board that can store handwriting information by which the conference can be continued at a later date by reading the stored information.

As an example of such an electronic information board, Japanese Unexamined Patent Application Publication No. 2014-52873 discloses means for storing the stroke image by performing handwriting rendering on a layer created by layer creating means to easily handle a handwriting document including a plurality of layers.

On the electronic information board described above, mounted are a function of recognizing a handwriting character and a function of rendering a figure (a line, a square, and a circle) or an image (SVG image). However, there has been a problem in that the character, the figure, and the image that are stored cannot be read again to be edited after text, the figure, the image and the like rendered by the function of recognizing a handwriting character or the rendering function are stored.

Japanese Unexamined Patent Application Publication No. 2014-52873 discloses a point of creating a layer and storing a stroke image drawn by handwriting. However, the problem described above is not solved, the problem that the character, the figure, and the image that are stored cannot be read again to be edited after the character, the figure, and the image are stored.

There has been a problem in that, after a character, a symbol, a figure, or an emblem image representing a combination thereof are stored, they cannot be edited even when being read again.

SUMMARY OF THE INVENTION

According to one aspect of the present invention, an image processing device includes a handwriting image renderer, an image renderer, an external image renderer, a serializer, a document creator, a handwriting recognizer, and a character concatenation unit. The handwriting image renderer is configured to render a stroke on a first layer. The image renderer is configured to render an image representing at least one of a character, a symbol, and a figure on a second layer lower than the first layer. The external image renderer is configured to render an external image that is externally acquired on a third layer lower than the second layer. The serializer is configured to convert the stroke rendered on the first layer, the image rendered on the second layer, and the external image rendered on the third layer into data in a text format. The document creator is configured to create document data corresponding to one page based on the data in a text format converted by the serializer. The handwriting recognizer is configured to perform character recognition processing on a character string image represented by the stroke to acquire a character string from the character string image. The character concatenation unit is configured to determine whether adjacent characters on the character string acquired by the handwriting recognizer have common character information including a font name, a font size, a color, a height, an em or an en, and a locale, and concatenate the adjacent characters when the adjacent characters have the common character information.

BRIEF DESCRIPTION OF THE DRAWINGS

FIG. 6 is a conceptual diagram illustrating page data;

FIG. 7 is a conceptual diagram illustrating stroke data;

FIG. 8 is a conceptual diagram illustrating coordinate arrangement data;

FIG. 9 is a conceptual diagram illustrating media data;

FIG. 10 is a conceptual diagram illustrating a remote license management table;

FIG. 11 is a conceptual diagram illustrating an address book management table;

FIG. 12 is a conceptual diagram illustrating backup data;

FIG. 13 is a conceptual diagram illustrating a connection destination management table;

FIG. 14 is a conceptual diagram illustrating a participation site management table;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
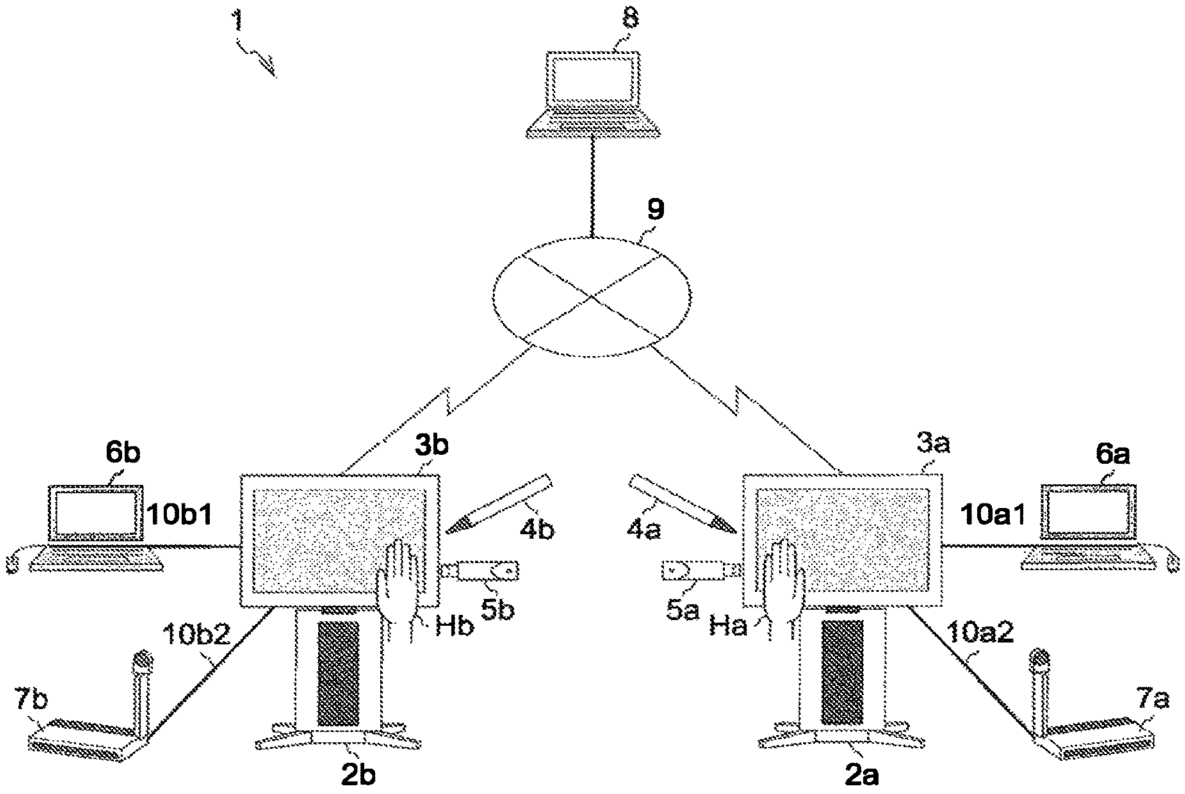
FIG. 1 is an entire configuration diagram of an image processing system according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide a method of storing an emblem image rendered on an electronic whiteboard in a general-purpose file format to be utilized, and reading the emblem image to be edited again.

Outline of System

FIG. 1 is an entire configuration diagram of an image processing system according to the embodiment. To simplify the description, FIG. 1 only illustrates two electronic whiteboards 2*a* and 2*b*, electronic pens 4*a* and 4*b* corresponding thereto, and the like. Alternatively, three or more electronic whiteboards or electronic pens may be utilized.

As illustrated in FIG. 1, an image processing system 1 includes a plurality of electronic whiteboards 2*a* and 2*b*, a plurality of electronic pens 4*a* and 4*b*, USB memories 5*a* and 5*b*, notebook personal computers (PCs) 6*a* and 6*b*, television (video) conference terminals 7*a* and 7*b*, and a PC 8. The electronic whiteboards 2*a* and 2*b* and the PC 8 are communicably connected to each other via a communication network 9. Displays 3*a* and 3*b* are provided to the electronic whiteboards 2*a* and 2*b*, respectively.

The electronic whiteboard 2*a* can display, on the display 3*a*, a drawn image due to an event caused by the electronic pen 4*a* (the display 3*a* is touched by the tip of the electronic pen 4*a*, or touched by the rear of the electronic pen 4*a*). The electronic whiteboard 2*a* can also change the image displayed on the display 3*a* based on the event caused by not only the electronic pen 4*a* but also a hand Ha and the like of a user (gesture such as magnification, reduction, and turning pages).

The USB memory 5*a* can be connected to the electronic whiteboard 2*a*. The electronic whiteboard 2*a* can read an electronic file such as PDF from the USB memory 5*a* or can record the electronic file in the USB memory 5*a*. The notebook PC 6*a* is connected to the electronic whiteboard 2*a* via a cable 10*a*1 that enables communication based on a standard such as DisplayPort, a digital visual interface (DVI), a high-definition multimedia interface (HDMI) (registered trademark), and a video graphics array (VGA). The electronic whiteboard 2*a* causes an event when the display 3*a* is touched, and transmits event information representing the event to the notebook PC 6*a* similarly to an event from an input device such as a mouse or a keyboard. Similarly, the television (video) conference terminal 7*a* is connected to the electronic whiteboard 2*a* via a cable 10*a*2 that enables communication based on the above standard. The notebook PC 6*a* and the video conference terminal 7*a* may communicate with the electronic whiteboard 2*a* through wireless communication conforming to various wireless communication protocols such as Bluetooth (registered trademark).

On the other hand, at another site where the electronic whiteboard 2*b* is arranged, the electronic whiteboard 2*b* including the display 3*b*, the electronic pen 4*b*, the USB memory 5*b*, the notebook PC 6*b*, the video conference terminal 7*b*, the cable 10*b*1, and the cable 10*b*2 are used similarly to the above. The image displayed on the display 3*b* can also be changed based on an event caused by a hand Hb and the like of the user.

Accordingly, the image rendered on the display 3*a* of the electronic whiteboard 2*a* at one site is also displayed on the display 3*b* of the electronic whiteboard 2*b* at the other site. In contrast, the image rendered on the display 3*b* of the electronic whiteboard 2*b* at the other site is also displayed on the display 3*a* of the electronic whiteboard 2*a* at the former site. In this way, the image processing system 1 can perform remote sharing processing for sharing the same image between remote places, so that the image processing system 1 is very convenient when being used for a conference and the like at remote places.

Hereinafter, an arbitrary electronic whiteboard among a plurality of electronic whiteboards is represented as an "electronic whiteboard 2". An arbitrary display among a plurality of displays is represented as a "display 3". An arbitrary electronic pen among a plurality of electronic pens is represented as an "electronic pen 4". An arbitrary USB memory among a plurality of USB memories is represented as a "USB memory 5". An arbitrary notebook PC among a plurality of notebook PCs is represented as a "notebook PC 6". An arbitrary video conference terminal among a plurality of video conference terminals is represented as a "video conference terminal 7". An arbitrary hand among a plurality of hands of users is represented as a "hand H". An arbitrary cable among a plurality of cables is represented as a "cable 10".

In the embodiment, the electronic whiteboard is described as an example of an image processing device. However, the embodiment is not limited thereto. Examples of the image processing device may also include an electronic signboard (digital signage), a telestrator utilized for sports, weather forecast, and the like, or a remote image (video) diagnostic device. The notebook PC 6 is described as an example of an information processing terminal, but the embodiment is not limited thereto. Examples of the information processing terminal may also include terminals that can supply an image frame such as a desktop PC or a tablet PC, a PDA, a digital video camera, a digital camera, and a game machine. The communication network also includes the Internet, a local area network (LAN), a mobile phone communication network, and the like. In the embodiment, the USB memory is described as an example of a storage medium. However, the embodiment is not limited thereto. Examples of the storage medium may also include various storage media such as an SD card.

Hardware Configuration of Electronic Whiteboard

Figure 2:
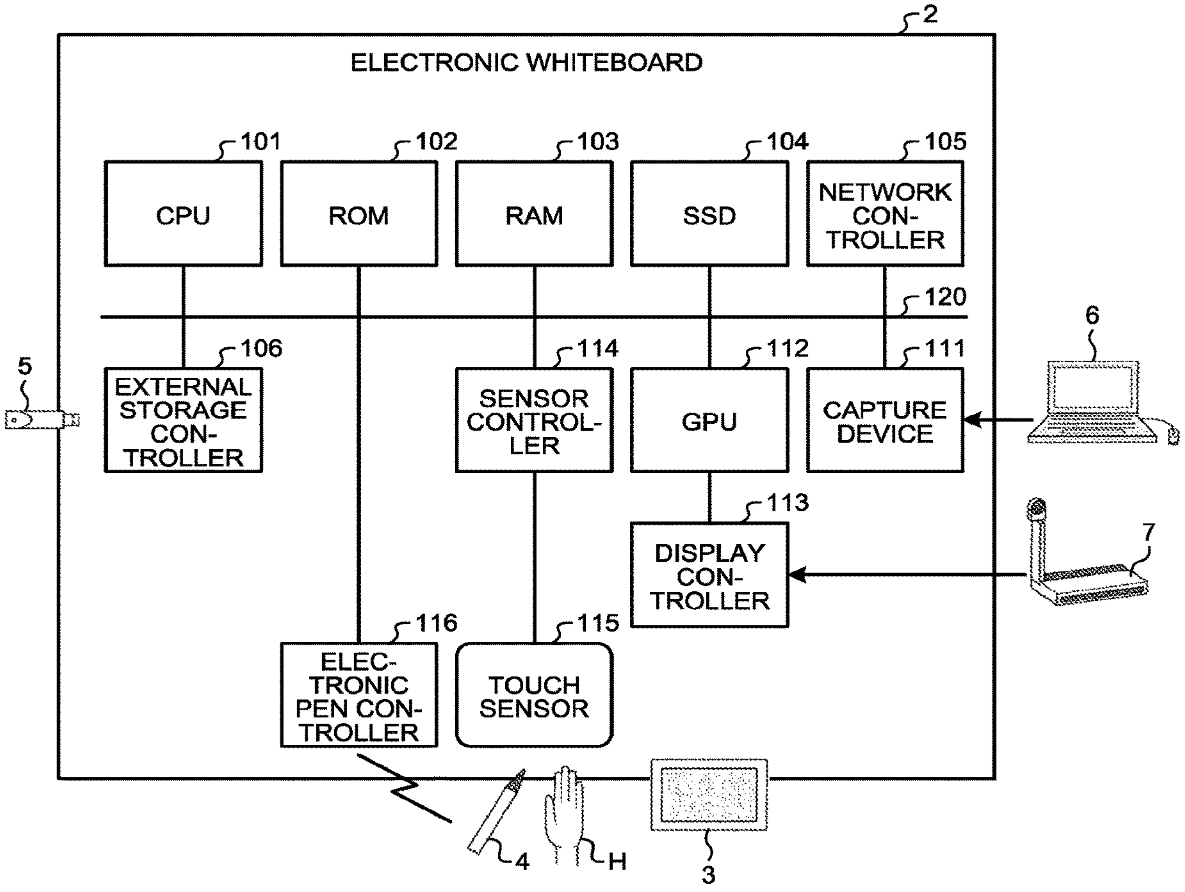
FIG. 2 is a hardware configuration diagram of an electronic whiteboard.

The following describes a hardware configuration of the electronic whiteboard according to the embodiment with reference to FIG. 2. FIG. 2 is a hardware configuration diagram of the electronic whiteboard.

As illustrated in FIG. 2, the electronic whiteboard 2 includes a CPU 101 configured to control the entire operation of the electronic whiteboard 2, a ROM 102 configured to store a computer program used for driving the CPU 101 such as an IPL, a RAM 103 used as a work area for the CPU 101, an SSD 104 configured to store various pieces of data such as a computer program for the electronic whiteboard 2, a network controller 105 configured to control communication with the communication network 9, and an external storage controller 106 configured to control communication with the USB memory 5.

The electronic whiteboard 2 includes a capture device 111 configured to display video information as a static image or a moving image on the display of the notebook PC 6, a graphics processing unit (GPU) 112 configured to specialize in graphics, and a display controller 113 configured to control and manage screen display for outputting an output image from the GPU to the display 3 or the video conference terminal 7.

The electronic whiteboard 2 further includes a sensor controller 114 configured to control processing of a touch sensor 115, which detects that the display 3 is touched by the electronic pen 4, the hand H of the user, and the like. The touch sensor 115 inputs coordinates and detects the coordinates using an infrared ray blocking system. The method of inputting the coordinates and detecting the coordinates is a method of receiving light, which is a plurality of infrared rays emitted from two light receiving and emitting devices (not illustrated) that are arranged on both ends of an upper part of the display 3 in parallel with the display 3, reflected by a reflection member arranged around the display 3, and returns through the same optical path as that of light emitted from a light receiving element. The touch sensor 115 outputs identifications (IDs) of the infrared rays emitted from the two light receiving and emitting devices blocked by an object to the sensor controller 114, and the sensor controller 114 recognizes a coordinate position as a contact position of the object. Each of all IDs described below is an example of identification information.

As the touch sensor 115, not limited to the infrared ray blocking system, various detection means may be used such as an electrostatic capacitance type touch panel configured to recognize the contact position by detecting a change in capacitance, a resistance film type touch panel configured to recognize the contact position due to a change in voltage of two opposed resistance films, and an electromagnetic induction type touch panel configured to recognize the contact position by detecting electromagnetic induction caused by a contact object being brought into contact with a display unit.

The electronic whiteboard 2 also includes an electronic pen controller 116. The electronic pen controller 116 communicates with the electronic pen 4 to determine whether the display 3 is touched by the tip or the rear of the pen. The electronic pen controller 116 may determine whether the display 3 is touched by a part of the electronic pen 4 gripped by the user or other parts thereof, in addition to the tip and the rear of the electronic pen 4.

The electronic whiteboard 2 further includes a bus line 120 such as an address bus and a data bus for electrically connecting the CPU 101, the ROM 102, the RAM 103, the SSD 104, the network controller 105, the external storage controller 106, the capture device 111, the GPU 112, the sensor controller 114, and the electronic pen controller 116 with each other as illustrated in FIG. 2.

The computer program for the electronic whiteboard 2 may be stored in a computer-readable storage medium such as a CD-ROM to be distributed.

Functional Configuration of Electronic Whiteboard

Figure 3:
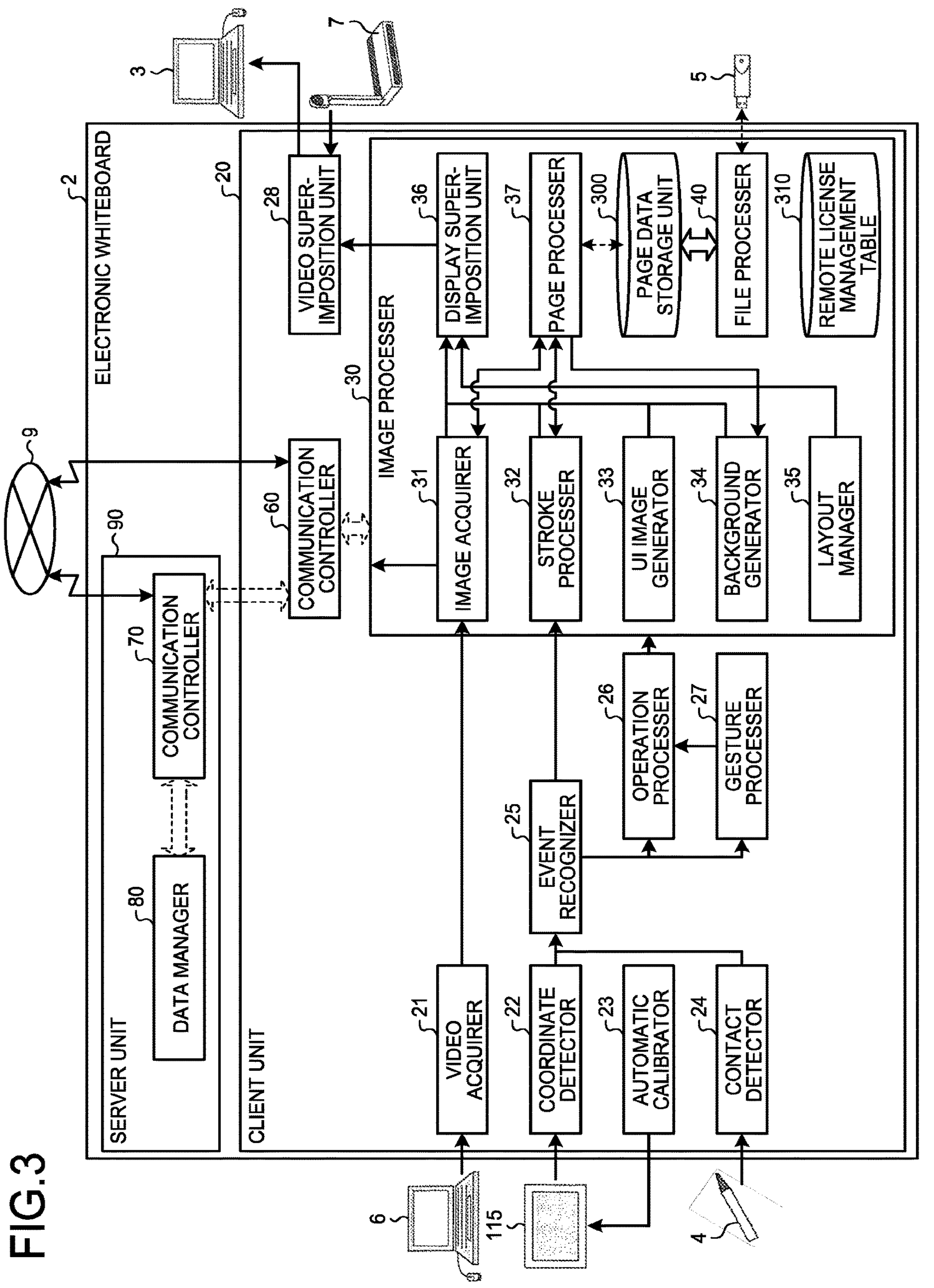
FIG. 3 is a functional block diagram of the electronic whiteboard.

The following describes a functional configuration of the electronic whiteboard with reference to FIG. 3 to FIG. 16. First, the following describes the entire functional configuration of the electronic whiteboard 2 with reference to FIG. 3. FIG. 3 is a functional block diagram of the electronic whiteboard.

The electronic whiteboard 2 has functional configurations illustrated in FIG. 3 due to the hardware configuration and the computer program illustrated in FIG. 2. The electronic whiteboard 2 may be a "host device" that starts remote sharing processing first, and may be a "participating device" that participates in the remote sharing processing that has been already started later. The electronic whiteboard 2 can be roughly divided into a client unit 20 and a server unit 90. The client unit 20 and the server unit 90 are functions implemented in the inside of a housing of the electronic whiteboard 2. When the electronic whiteboard 2 is the host device, the client unit 20 and the server unit 90 are implemented in the electronic whiteboard 2. When the electronic whiteboard 2 is the participating device, the client unit 20 is implemented but the server unit 90 is not implemented in the electronic whiteboard 2. That is, in FIG. 1, when the electronic whiteboard 2*a* is the host device and the electronic whiteboard 2*b* is the participating device, the client unit 20 of the electronic whiteboard 2*a* communicates with the client unit 20 of the electronic whiteboard 2*b* via the server unit 90 implemented in the same electronic whiteboard 2*a*. On the other hand, the client unit 20 of the electronic whiteboard 2*b* communicates with the client unit of the electronic whiteboard 2*a* via the server unit 90 implemented in the electronic whiteboard 2*a*.

Functional Configuration of Client Unit 20

Figure 4:
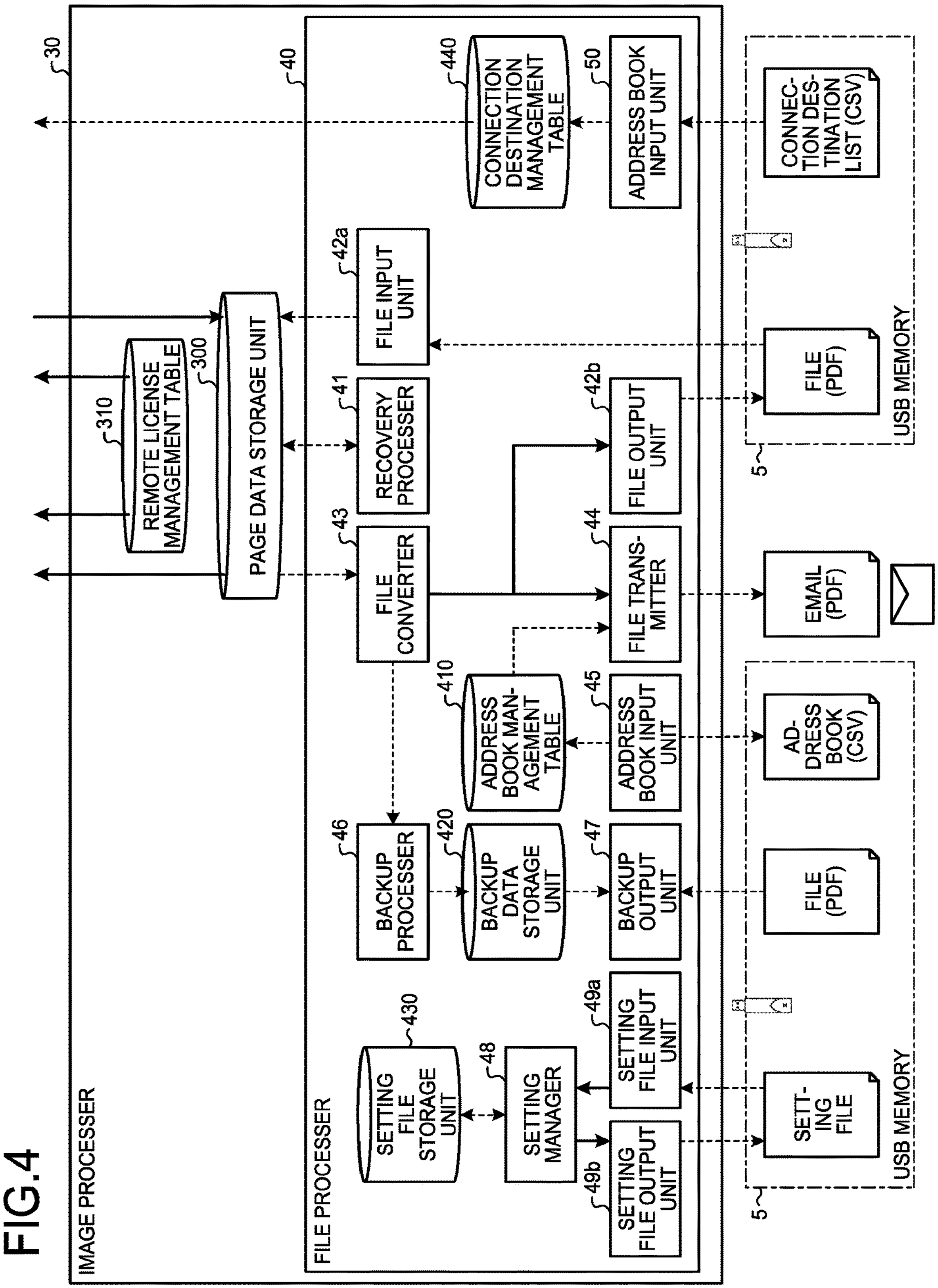
FIG. 4 is a functional block diagram of a file processor.

Subsequently, the following describes a functional configuration of the client unit 20 mainly with reference to FIG. 3 to FIG. 5. The client unit 20 includes a video acquirer 21, a coordinate detector 22, an automatic calibrator 23, a contact detector 24, an event recognizer 25, an operation processor 26, a gesture processor 27, a video superimposition unit 28, an image processor 30, and a communication controller 60.

Among these, the video acquirer 21 acquires an output video from a video output device connected to the cable 10. When receiving an image signal from the video output device, the video acquirer 21 analyzes the image signal to derive image information such as resolution of an image frame as a display image of the video output device formed by the image signal and update frequency of the image frame, and outputs the image information to an image acquirer 31.

The coordinate detector 22 detects a coordinate position of an event caused by the user on the display 3 (for example, the display 3 is touched by the hand H of the user). The coordinate detector 22 also detects a touched area.

The automatic calibrator 23 is started when the electronic whiteboard 2 is started, and adjusts a parameter of image processing performed by a sensor camera with an optical sensor system of the touch sensor 115 so that the touch sensor 115 can output an appropriate value to the coordinate detector 22.

The contact detector 24 detects an event caused by the user (for example, the display 3 is pressed (touched) by the tip of the electronic pen 4 or the rear of the electronic pen 4).

The event recognizer 25 distributes the coordinate position of the event detected by the coordinate detector 22 and a detection result detected by the contact detector 24 to events including stroke drawing, a UI operation, and a gesture operation.

In this case, "stroke drawing" represents an event in which, when a stroke (B) illustrated in FIG. 16 (described later) is displayed on the display 3, the user presses the electronic pen 4 onto the display 3 and moves the electronic pen 4 in a state of being pressed, and finally lifts the electronic pen 4 from the display 3. Due to the stroke drawing, for example, alphabets such as "S" and "T" are drawn on the display 3. The "stroke drawing" also includes an event of deleting an image that has been already rendered or editing the rendered image in addition to the event of drawing the image.

The "UI operation" represents an event in which the user presses a predetermined position with the electronic pen 4 or the hand H when a UI image (A) illustrated in FIG. 16 (described later) is displayed on the display 3. Due to the UI operation, for example, a color, a width, and the like of a line drawn by the electronic pen 4 are set.

The "gesture operation" represents an event in which, when the stroke (B) illustrated in FIG. 16 (described later) is displayed on the display 3, the user touches the display 3 with the hand H or moves the hand H. Due to the gesture operation, for example, when the user moves the hand H in a state in which the display 3 is touched by the hand H, an image can be magnified (or reduced), a display region can be changed, a page can be switched, and the like.

The operation processor 26 performs various operations according to a UI element causing the event from the UI operation determined by the event recognizer 25. Examples of the UI element include a button, a list, a check box, and a text box.

The gesture processor 27 performs an operation corresponding to the gesture operation determined by the event recognizer 25.

The video superimposition unit 28 displays, on the video output device (such as the display 3), an image superimposed by a display superimposition unit 36 (described later) as video. The video superimposition unit 28 overlays a video sent from the other video output device (such as the video conference terminal 7) on a video from the video output device (such as the notebook PC 6) using a picture-in-picture scheme. The video superimposition unit 28 performs switching to display the video displayed on part of the display 3 using the picture-in-picture scheme on the entire display 3.

Figures 15, 16:
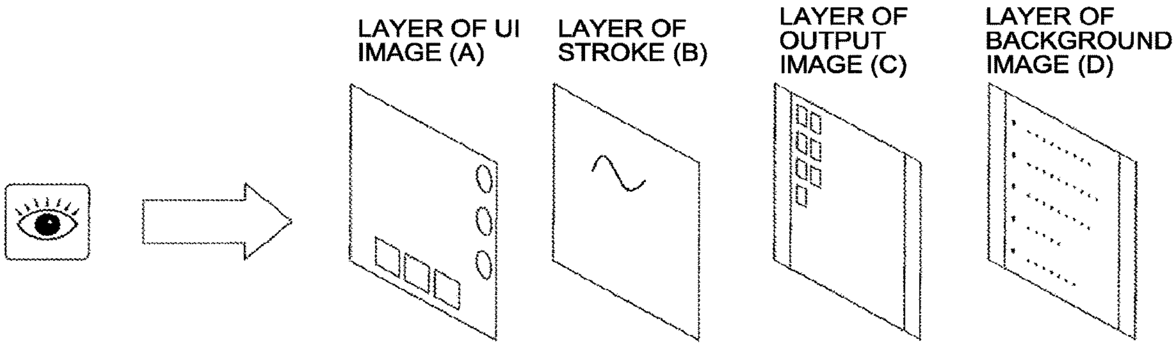
FIG. 15 is a conceptual diagram illustrating operation data.
FIG. 16 is a configuration diagram of image layers.

The image processor 30 performs superimposition processing and the like of image layers as illustrated in FIG. 16. The image processor 30 includes the image acquirer 31, a stroke processor 32, a UI image generator 33, a background generator 34, a layout manager 35, the display superimposition unit 36, a page processor 37, a file processor 40, a page data storage unit 300, and a remote license management table 310.

Among these, the image acquirer 31 acquires each frame as an image from the video acquired by the video acquirer 21. The image acquirer 31 outputs data of the image to the page processor 37. The image corresponds to an output image (C) from the video output device (such as the notebook PC 6) illustrated in FIG. 16.

The stroke processor 32 renders a stroke, deletes the rendered stroke, or edits the rendered stroke based on the event related to stroke drawing recognized by the event recognizer 25. The image obtained through the stroke drawing corresponds to the stroke (B) illustrated in FIG. 16. Results of rendering, deleting, and editing of the image based on the stroke drawing are stored in an operation data storage unit 840 as operation data described later.

The UI image generator 33 generates a user interface (UI) image set in advance in the electronic whiteboard 2. This UI image corresponds to the UI image (A) illustrated in FIG. 16.

The background generator 34 receives, from the page processor 37, a piece of media data in page data read by the page processor 37 from the page data storage unit 300. The background generator 34 outputs the received media data to the display superimposition unit 36. The image based on the media data corresponds to a background image (D) illustrated in FIG. 16. Examples of a pattern of the background image (D) include a plain and a grid reference.

The layout manager 35 manages layout information on layout of each of images output to the display superimposition unit 36 from the image acquirer 31, the stroke processor 32, and the UI image generator 33 (or the background generator 34). Accordingly, the layout manager 35 can instruct the display superimposition unit 36 to display the output image (C) and the stroke (B) at any point in the UI image (A) and the background image (D), or not to display them.

The display superimposition unit 36 lays out each of the images output from the image acquirer 31, the stroke processor 32, and the UI image generator 33 (background generator 34) based on the layout information output from the layout manager 35.

The page processor 37 puts the data of the stroke image (B) and the data of the output image (C) together as one piece of page data, and stores the data in the page data storage unit 300. The data of the stroke (B) is part of the page data serving as stroke arrangement data (each piece of stroke data) indicated by a stroke arrangement data ID illustrated in FIG. 6. The data of the output image (C) is part of the page data serving as the media data indicated by a media data ID illustrated in FIG. 6. The media data is handled as the data of the background image (D) when being read from the page data storage unit 300.

When the page processor 37 transmits the media data in the page data that is temporarily stored to the display superimposition unit 36 via the background generator 34, the video superimposition unit 28 can display the background image (D) on the display 3 again. The page processor 37 returns the stroke arrangement data (each piece of stroke data) in the page data to the stroke processor 32 to enable editing of the stroke again. The page processor 37 can also delete or copy the page data.

That is, the data of the output image (C) displayed on the display 3 at a time point when the page processor 37 stores the page data in the page data storage unit 300 is temporarily stored in the page data storage unit 300, and is read as the media data representing the background image (D) when being read from the page data storage unit 300 thereafter. The page processor 37 then outputs the stroke arrangement data representing the stroke (B) in the page data read from the page data storage unit 300 to the stroke processor 32. The page processor 37 also outputs the media data representing the background image (D) in the page data read from the page data storage unit 300 to the background generator 34.

The display superimposition unit 36 superimposes the output image (C) from the image acquirer 31, the stroke (B) from the stroke processor 32, the UI image (A) from the UI image generator 33, and the background image (D) from the background generator 34 according to the layout designated by the layout manager 35. Accordingly, as illustrated in FIG. 16, layers are configured to be arranged in the order, which can be seen by the user even when the images are overlapped, of the UI image (A), the stroke (B), the output image (C), and the background image (D).

The display superimposition unit 36 can switch the image (C) and the image (D) illustrated in FIG. 16 to be exclusively superimposed on the image (A) and the image (B). For example, initially, when the cable 10 between the electronic whiteboard 2 and the video output device (such as the notebook PC 6) is pulled out in a state in which the image (A), the image (B), and the image (C) are displayed, the image (C) can be excluded from a target of superimposition according to the designation from the layout manager 35, and the image (D) can be displayed. In this case, the display superimposition unit 36 also magnifies the display, reduces the display, and performs processing of moving the display region.

The page data storage unit 300 stores the page data as illustrated in FIG. 6. FIG. 6 is a conceptual diagram illustrating the page data. The page data is data corresponding to one page (the stroke arrangement data (each piece of stroke data) and the media data) displayed on the display 3. The page data includes many types of parameters, so that content of the page data is described separately for each of FIG. 6 to FIG. 9 herein.

As illustrated in FIG. 6, in the page data, a page data ID for identifying an arbitrary page, a start time indicating a time when the page is started to be displayed, an end time indicating a time when the content of the page is no more rewritten with the stroke, the gesture, and the like, the stroke arrangement data ID for identifying the stroke arrangement data generated by the stroke with the electronic pen 4 or the hand H of the user, and the media data ID for identifying the media data are associated with each other to be stored. The stroke arrangement data is data for displaying the stroke (B) illustrated in FIG. 16 (described later) on the display 3. The media data is data for displaying the background image (D) illustrated in FIG. 16 (described later) on the display 3.

Due to such page data, for example, when the user draws the alphabet “S” with the electronic pen 4, a single stroke is required, so that the one alphabet “S” is represented using one stroke data ID. However, when the user draws the alphabet “T” with the electronic pen 4, two strokes are required, so that the one alphabet “T” is represented using two stroke data IDs.

As illustrated in FIG. 7, the stroke arrangement data represents detailed information. FIG. 7 is a conceptual diagram illustrating the stroke arrangement data. As illustrated in FIG. 7, one piece of stroke arrangement data is represented with a plurality of pieces of stroke data. The one piece of stroke data represents the stroke data ID for identifying the stroke data, the start time indicating the time when one stroke is started to be rendered, the end time indicating the time when drawing of one stroke is finished, a color of the stroke, a width of the stroke, and a coordinate arrangement data ID for identifying an arrangement of passing points of the stroke.

The coordinate arrangement data represents detailed information as illustrated in FIG. 8. FIG. 8 is a conceptual diagram illustrating the coordinate arrangement data. As illustrated in FIG. 8, the coordinate arrangement data represents pieces of information including a point on the display 3 (X-coordinate value, Y-coordinate value), a time difference (milliseconds) from the start time of the stroke when passing through the point, and a writing pressure of the electronic pen 4 at the point. That is, a group of the points illustrated in FIG. 8 is represented as one piece of coordinate arrangement data illustrated in FIG. 7. For example, when the user draws the alphabet “S” with the electronic pen 4, a single stroke is required, but the electronic pen 4 passes through a plurality of passing points until finishing the drawing of “S”, so that the coordinate arrangement data represents information about the passing points.

The media data in the page data illustrated in FIG. 6 illustrates detailed information as illustrated in FIG. 9. FIG. 9 is a conceptual diagram illustrating the media data. As illustrated in FIG. 9, in the media data, the media data ID in the page data illustrated in FIG. 6, a data type of the media data, a recording time when the page data is stored in the page data storage unit 300 from the page processor 37, the position (X-coordinate value, Y-coordinate value) of the image displayed on the display 3 based on the page data, a size (the width and the height) of the image, and data representing the content of the media data are associated with each other to be represented. Among these, the position of the image displayed on the display 3 based on the page data indicates the position of an upper left end of the image displayed based on the page data assuming that coordinates of an upper left end of the display 3 is (X-coordinate value, Y-coordinate value)=(0, 0).

Returning to FIG. 3, the remote license management table 310 manages license data required for performing remote sharing processing. In the remote license management table 310, as illustrated in FIG. 10, a product ID of the electronic whiteboard 2, a license ID used for authentication, and an expiration date of the license are associated with each other to be managed.

Functional Configuration of File Processor 40

Subsequently, the following describes a functional configuration of the file processor 40 illustrated in FIG. 3 with reference to FIG. 4. FIG. 4 is a functional block diagram of the file processor.

The file processor 40 includes a recovery processor 41, a file input unit 42*a*, a file output unit 42*b*, a file converter 43, a file transmitter 44, an address book input unit 45, a backup processor 46, a backup output unit 47, a setting manager 48, a setting file input unit 49*a*, and a setting file output unit 49*b*. The file processor 40 further includes an address book management table 410, a backup data storage unit 420, a setting file storage unit 430, and a connection destination management table 440.

Among these, after the electronic whiteboard 2 is abnormally terminated, the recovery processor 41 detects the abnormal termination and recovers the page data that is not stored yet. For example, in a case of normal termination, the page data is stored as a PDF file in the USB 5 via the file processor 40. However, in the case of abnormal termination in which a power supply is down and the like, the page data is remained to be stored in the page data storage unit 300. Thus, when the power supply is turned on again, the recovery processor 41 reads out the page data from the page data storage unit 300 to be recovered.

The file input unit 42*a* reads the PDF file from the USB memory 5, and stores each page as the page data in the page data storage unit 300.

The file converter 43 converts the page data stored in the page data storage unit 300 into a PDF file.

The file output unit 42*b* stores the PDF file output from the file converter 42 in the USB memory 5.

The file transmitter 44 attaches the PDF file generated by the file converter 43 to an email to be transmitted. A transmission destination of the file is determined when the display superimposition unit 36 displays the content of the address book management table 410 on the display 3 and the file transmitter 44 receives selection of the destination through an operation of an input device such as a touch panel by the user. In the address book management table 410, as illustrated in FIG. 11, a name of the destination and an email address of the destination are associated with each other to be managed. The file transmitter 44 can also receive an input of the email address as the destination through the operation of the input device such as a touch panel by the user.

The address book input unit 45 reads a list file of email address from the USB memory 5 to be managed in the address book management table 410.

The backup processor 46 stores the file output from the file output unit 42*b* or the file transmitted by the file transmitter 44 in the backup data storage unit 420 to be backed up. When the user does not set the backup, the backup processing is not performed. The backup data is stored in a PDF format as illustrated in FIG. 12.

The backup output unit 47 stores the backed-up file in the USB memory 5. When the backed-up file is stored, a password is input for security through an operation of the input device such as a touch panel by the user.

The setting manager 48 manages various pieces of setting information of the electronic whiteboard 2 by storing them in the setting file storage unit 430 or reading them out. Examples of the various pieces of setting information include network setting, setting of date and time, setting of region and language, setting of email server, setting of address book, setting of connection destination list, and setting related to backup. Examples of the network setting include setting of the IP address of the electronic whiteboard 2, setting of network mask, setting of default gateway, or setting of domain name system (DNS).

The setting file output unit 49*b* causes the USB memory 5 to store the various pieces of setting information of the electronic whiteboard 2 as a setting file. The user cannot see the content of the setting file for security reasons.

The setting file input unit 49*a* reads the setting file stored in the USB memory 5, and reflects the various pieces of setting information in various settings of the electronic whiteboard.

The address book input unit 50 reads a list file of connection destination IP address of the remote sharing processing from the USE memory 5 to be managed in the connection destination management table 440. As illustrated in FIG. 13, the connection destination management table 440 is a table for managing the connection destination in advance, when the electronic whiteboard 2 is the participating device intending to participate in the remote sharing processing, to reduce labor of inputting the IP address of the electronic whiteboard serving as the host device by the user of the participating device. In the connection destination management table 440, the name of the site at which the electronic whiteboard 2 serving as the host device in which the other device can participate is arranged and the IP address of the electronic whiteboard 2 serving as the host device are associated with each other to be managed.

The connection destination management table 440 may be omitted. However, in such a case, the user of the participating device needs to input the IP address of the host device via the input device such as a touch panel to start remote request processing between the participating device and the host device. Thus, the user of the participating device acquires the IP address of the host device from the user of the host device using a telephone, an email, and the like.

Functional Configuration of Communication Controller 60

Figure 5:
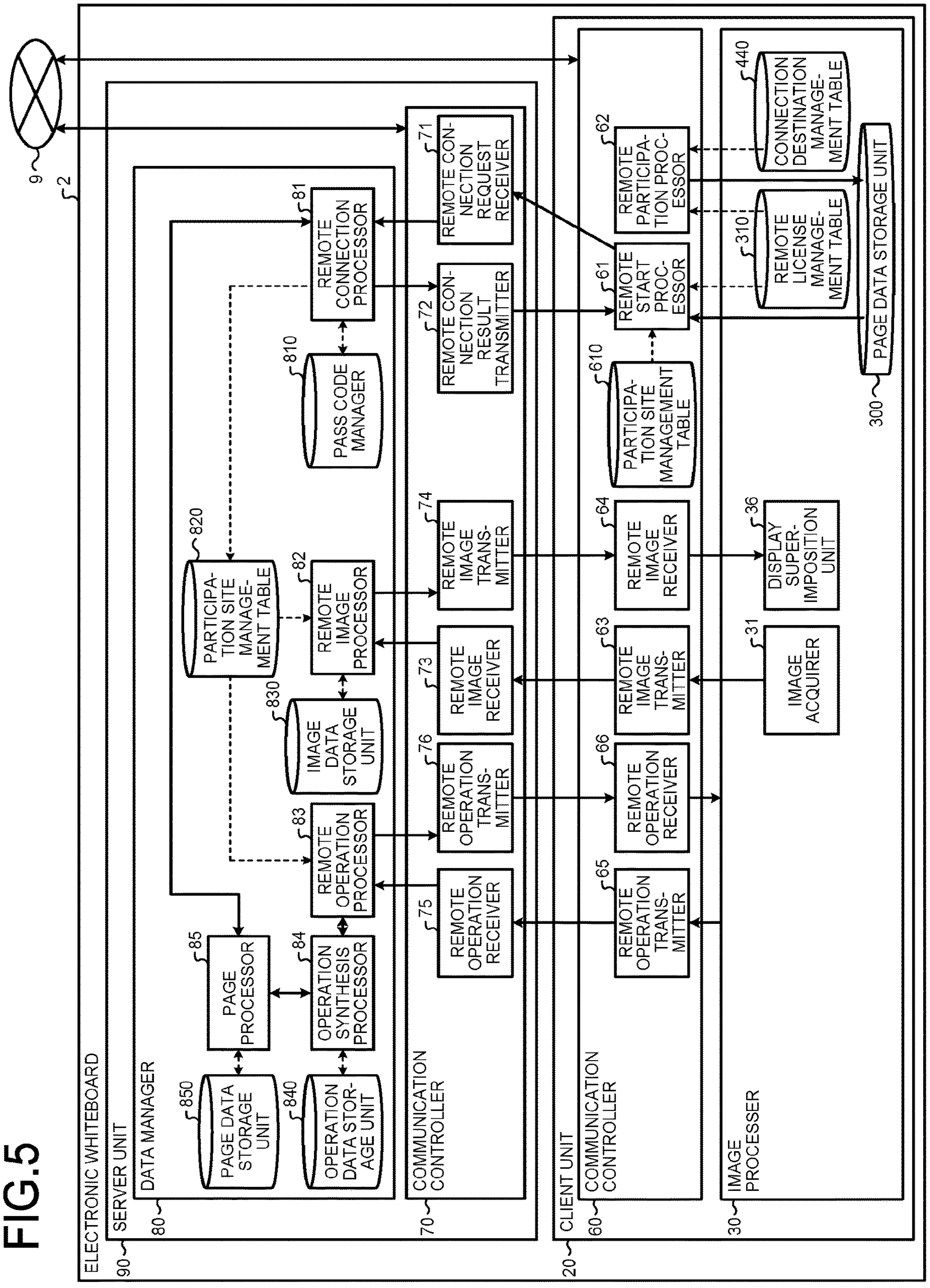
FIG. 5 is a functional block diagram of a server unit and a transmission controller.

Next, the following describes a functional configuration of the communication controller 60 with reference to FIG. 5.

The communication controller 60 controls communication with the other electronic whiteboard 2 and communication with a communication controller 70 (described later) in the server unit 90 via the communication network 9. For this purpose, the communication controller 60 includes a remote start processor 61, a remote participation processor 62, a remote image transmitter 63, a remote image receiver 64, a remote operation transmitter 65, a remote operation receiver 66, and a participation site management table 610.

Among these, the remote start processor 61 makes a request to the server unit 90 of the same electronic whiteboard 2 for starting the remote sharing processing again, and receives a result of the request from the server unit 90. In this case, the remote start processor 61 refers to the remote license management table 310, and can make a request for starting the remote sharing processing if license information (the product ID, the license ID, and the expiration date) is managed therein. However, if the license information is not managed therein, the request for starting the remote sharing processing cannot be made.

When the electronic whiteboard is the host device, the participation site management table 610 is a table for managing the electronic whiteboard serving as the participating device currently participating in the remote sharing processing. As illustrated in FIG. 14, in the participation site management table 610, the name of the site at which the participating electronic whiteboard 2 is arranged and the IP address of the electronic whiteboard 2 are associated with each other to be managed.

The remote participation processor 62 makes a request to a remote connection request receiver 71 in the server unit 90 of the electronic whiteboard 2 serving as the host device that has already started the remote sharing processing for participating in the remote sharing processing via the communication network 9. Also in this case, the remote participation processor 62 refers to the remote license management table 310. To participate in the remote sharing processing that has been already started, the remote participation processor 62 refers to the connection destination management table 440 to acquire the IP address of the electronic whiteboard 2 as a participation destination. The remote participation processor 62 does not necessarily refer to the connection destination management table. The IP address of the electronic whiteboard 2 as the participation destination may be input through an operation of the input device such as a touch panel by the user.

The remote image transmitter 63 transmits, to the server unit 90, the output image (C) transmitted from the video acquirer 21 via the image acquirer 31.

The remote image receiver 64 receives, from the server unit 90, image data from the video output device connected to the other electronic whiteboard 2, and outputs the image data to the display superimposition unit 36 to enable the remote sharing processing.

The remote operation transmitter 65 transmits various pieces of operation data required for the remote sharing processing to the server unit 90. Examples of the various pieces of operation data include data related to addition of the stroke, deletion of the stroke, editing of the stroke (magnification, reduction, and movement), storage of the page data, creation of the page data, copy of the page data, deletion of the page data, and switching of the displayed page. The remote operation receiver 66 receives, from the server unit 90, the operation data input to the other electronic whiteboard 2, and outputs the operation data to the image processor 30 to perform remote sharing processing.

Functional Configuration of Server Unit

Subsequently, the following describes a functional configuration of the server unit 90 with reference to FIG. 5. The server unit 90 is provided to each electronic whiteboard 2, and can serve as the server unit in any of the electronic whiteboards 2. Thus, the server unit 90 includes the communication controller 70 and a data manager 80.

Functional Configuration of Communication Controller 70

Next, the following describes a functional configuration of the communication controller 70 with reference to FIG. 5.

The communication controller 70 controls communication with the communication controller 70 of the client unit 20 in the other electronic whiteboard 2 via the communication controller 70 of the client unit 20 in the same electronic whiteboard 2 and the communication network 9. The data manager 80 manages the operation data, the image data, and the like.

More specifically, the communication controller 70 includes the remote connection request receiver 71, a remote connection result transmitter 72, a remote image receiver 73, a remote image transmitter 74, a remote operation receiver 75, and a remote operation transmitter 76.

Among these, the remote connection request receiver 71 receives a request for starting the remote sharing processing from the remote start processor 61, and receives a request for participating in the remote sharing processing from the remote participation processor 62. The remote connection result transmitter 72 transmits a result of the request for starting the remote sharing processing to the remote start processor 61, and transmits a result of the request for participating in the remote sharing processing to the remote participation processor 62.

The remote image receiver 73 receives the image data (the data of the output image (C)) from the remote image transmitter 63, and transmits the image data to a remote image processor 82 described later. The remote image transmitter 74 receives the image data from the remote image processor 82, and transmits the image data to the remote image receiver 64.

The remote operation receiver 75 receives the operation data (the data such as the stroke (B)) from the remote operation transmitter 65, and transmits the operation data to a remote operation processor 83 described later. The remote operation transmitter 76 receives the operation data from the remote operation processor 83, and transmits the operation data to the remote operation receiver 66.

Functional Configuration of Data Manager

Next, the following describes a functional configuration of the data manager 80 with reference to FIG. 5.

The data manager 80 includes a remote connection processor 81, the remote image processor 82, the remote operation processor 83, an operation synthesis processor 84, and a page processor 85. The server unit 90 further includes a pass code manager 810, a participation site management table 820, an image data storage unit 830, the operation data storage unit 840, and a page data storage unit 850.

Among these, the remote connection processor 81 starts the remote sharing processing and ends the remote sharing processing. The remote connection processor 81 checks whether the license is present or a license period is not expired based on the license information received by the remote connection request receiver 71 from the remote start processor 61 together with the request for starting the remote sharing processing or the license information received from the remote participation processor 62 together with the request for participating in the remote sharing processing. The remote connection processor 81 also checks whether the number of participation requests from the other electronic whiteboard 2 serving as the client unit exceeds a predetermined number of devices that can participate in the processing.

The remote connection processor 81 determines whether a pass code that is transmitted when the other electronic whiteboard 2 makes a request for participating in the remote sharing processing is the same as a pass code managed by the pass code manager 810. If the pass codes are the same, the remote connection processor 81 permits participation in the remote sharing processing. The pass code is issued by the remote connection processor 81 when new remote sharing processing is started, and transmitted to the user of the electronic whiteboard 2 serving as the participating device intending to participate in the remote sharing processing from the user of the electronic whiteboard 2 serving as the host device using a telephone, an email, and the like. Accordingly, participation is permitted when the user of the participating device intending to participate in the remote sharing processing inputs the pass code to the participating device with the input device such as a touch panel to make a participation request. To put priority on usability for the user rather than security, only a license status may be checked and check of the pass code may be omitted.

When the electronic whiteboard 2 is the host device, the remote connection processor 81 stores participation site information included in the participation request transmitted from the remote participation processor 62 serving as the participating device via the communication network 9 in the participation site management table 820 of the server unit 90. The remote connection processor 81 then reads out remote site information stored in the participation site management table 820, and outputs the remote site information to the remote connection result transmitter 72. The remote connection result transmitter 72 transmits the remote site information to the remote start processor 61 of the client unit 20 in the same host device. The remote start processor 61 stores the remote site information in the participation site management table 610. Accordingly, in the host device, both of the client unit 20 and the server unit 90 manage the remote site information.

The remote image processor 82 receives the image data (output image (C)) from the video output device (such as the notebook PC 6) connected to the client unit (including the client unit of the electronic whiteboard that is the electronic whiteboard 2 serving as the host device) of each electronic whiteboard 2 during remote sharing processing, stores the image data in the image data storage unit 830, and determines an order of displaying image data on which remote sharing processing should be performed based on an order of time of arriving at the server unit 90 of the electronic whiteboard 2 serving as the host device. The remote image processor 82 refers to the participation site management table 820, and transmits the image data in the determined order to the client units 20 of all the electronic whiteboards 2 (including the client unit of the electronic whiteboard that is the electronic whiteboard 2 serving as the host device) participating in the remote sharing processing via the communication controller 70 (remote image transmitter 74).

The remote operation processor 83 receives various pieces of operation data such as a stroke (for example, the stroke (B)) rendered by the client unit of each electronic whiteboard 2 (including the client unit of the electronic whiteboard that is the electronic whiteboard 2 serving as the host device) during remote sharing processing, and determines the order of displaying the image on which remote sharing processing should be performed based on the order of time of arriving at the server unit 90 of the electronic whiteboard 2 serving as the host device. The various pieces of operation data are the same as the various pieces of operation data described above. The remote operation processor 83 refers to the participation site management table 820, and transmits the operation data to the client units 20 of all the electronic whiteboards 2 (including the client unit of the electronic whiteboard that is the electronic whiteboard 2 serving as the host device) during remote sharing processing.

The operation synthesis processor 84 synthesizes the pieces of operation data of the electronic whiteboards 2 output from the remote operation processor 83, and stores the operation data as a synthesis result in the operation data storage unit 840 to be returned to the remote operation processor 83. When the operation data is transmitted to the client unit of the electronic whiteboard serving as the host device and the client unit of the electronic whiteboard serving as the participating device from the remote operation transmitter 76, an image related to the same operation data is displayed on each of the electronic whiteboards 2. For this purpose, as illustrated in FIG. 15, in the operation data, sequence (SEQ), the operation name of the operation data, the IP address of the electronic whiteboard 2 that transmits the operation data and the Port No. of the client unit (server unit), the IP address of the electronic whiteboard 2 to which the operation data is transmitted and the Port No. of the client unit (server unit), the operation type of the operation data, the operation target of the operation data, and data representing the content of the operation data are associated with each other to be represented. For example, SEQ 1 shows that, when the stroke is rendered in the client unit (Port No.: 50001) of the electronic whiteboard (IP address: 192.0.0.1) serving as the host device, the operation data is transmitted to the server unit (Port No.: 50000) of the electronic whiteboard (IP address: 192.0.0.1) as the same host device. In this case, the operation type is “STROKE”, the operation target is the page data ID “p005”, and the data representing the content of the operation data is data representing the stroke. SEQ 2 shows that the operation data is transmitted from the server unit (Port No.: 50000) of the electronic whiteboard (IP address: 192.0.0.1) serving as the host device to the client unit (Port No.: 50001) of the other electronic whiteboard (IP address: 192.0.0.2) serving as the participating device.

The operation synthesis processor 84 performs synthesis in an input order of the operation data input to the operation synthesis processor 84, so that the stroke (B) is displayed on the displays 3 of all the electronic whiteboards 2 during remote sharing processing in the order of stroke by the user of each electronic whiteboard 2 unless the communication network 9 is congested.

Figure 17:
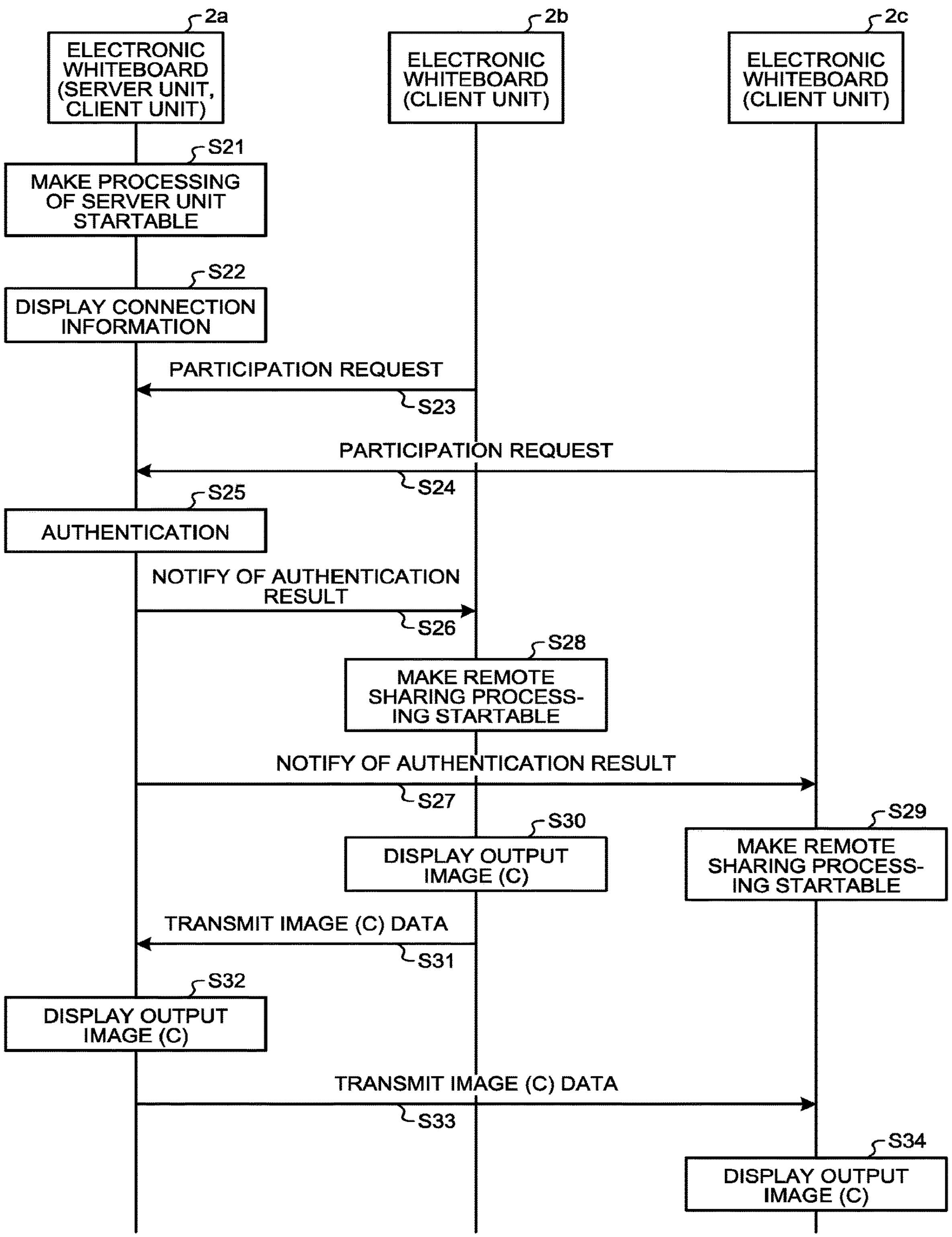
FIG. 17 is a sequence diagram illustrating processing in electronic whiteboards.
Figure 18:
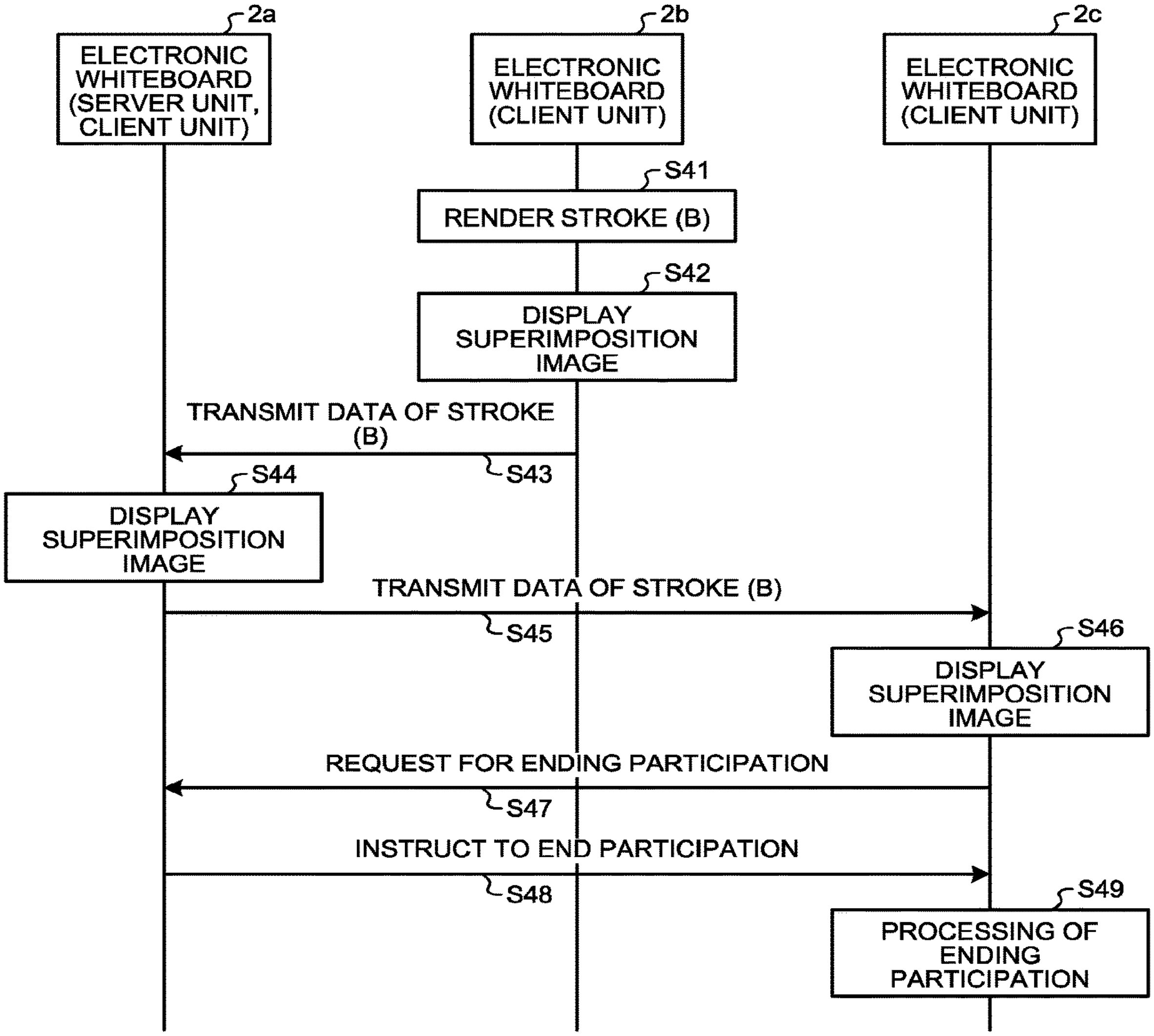
FIG. 18 is a sequence diagram illustrating processing in the electronic whiteboards.

The page processor 85 has the same function as the page processor 37 in the image processor 30 of the client unit 20, and the server unit 90 also stores the page data illustrated in FIG. 6 to FIG. 8 in the page data storage unit 850. The page data storage unit 850 is the same as the page data storage unit 300 in the image processor 30, so that the description thereof will not be repeated. Processing or operation according to embodiment Subsequently, the following describes processing or an operation according to the embodiment with reference to FIG. 17 and FIG. 18. FIG. 17 and FIG. 18 are sequence diagrams illustrating processing in each electronic whiteboard.

The embodiment illustrated in FIG. 17 and FIG. 18 describes a case in which the electronic whiteboard **2*a* serves as the host device (the server unit and the client unit) hosting the remote sharing processing, and the electronic whiteboards 2*b* and 2*c* serve as participating devices (client units) participating in the remote sharing processing. In this case, displays 3*a*, 3*b*, and 3*c* are connected to the electronic whiteboards 2*a*, 2*b*, and 2*c*, and notebook PCs 6*a*, 6*b*, and 6*c* are also connected thereto. In the electronic whiteboards 2*a*, 2*b*, and 2*c*, electronic pens 4*a*, 4*b*, and 4*c*** are used.

Participation Processing

First, the following describes processing for the electronic whiteboards **2*b* and 2*c* to participate in the remote sharing processing with reference to FIG. 17**.

When the user turns on a power switch of the electronic whiteboard **2*a*, the client unit 20 of the electronic whiteboard 2*a* is started. When the user performs an operation of starting the server unit 90 via the input device such as a touch panel, an instruction for starting processing of the server unit 90 is output from the remote start processor 61 of the client unit 20 to the remote connection request receiver 71 in the server unit 90 of the same electronic whiteboard 2*a*. Consequently, in the electronic whiteboard 2*a*, the server unit 90 can also start various pieces of processing in addition to the client unit (Step S21**).

Next, the UI image generator 33 in the client unit 20 of the electronic whiteboard **2*a* generates connection information for establishing connection to the electronic whiteboard 2*a*, and the video superimposition unit 28 causes the display 3*a* to display the connection information obtained from the UI image generator 33 via the display superimposition unit 36 (Step S22). The connection information includes the IP address of the host device and the pass code generated for the remote sharing processing at this time. In this case, the pass code stored in the pass code manager 810 is read out by the remote connection processor 81 illustrated in FIG. 5, and is transmitted to the remote connection result transmitter 72** and the remote start processor 61 in this order. The pass code is further transmitted from the communication controller 60 including the remote start processor 61 to the image processor 30 illustrated in FIG. 3, and finally input to the UI image generator 33. Thus, the connection information includes the pass code. The connection information is then transmitted by the user of the electronic whiteboard 2*a* to users of the electronic whiteboards 2*b* and 2*c* using a telephone or an email. Even when the connection information does not include the IP address of the host device, the participating device can make a participation request so long as the connection destination management table 440 is present.

Next, when each of the electronic whiteboards 2*b* and 2*c* receives an input of the connection information through the operation of the input device such as a touch panel by each user, the remote participation processor 62 in the client unit 20 of each of the electronic whiteboards 2*a* and 2*b* transmits the pass code to the communication controller 70 in the server unit 90 of the electronic whiteboard 2*a* via the communication network 9 based on the IP address of the connection information to make a participation request (Steps S23 and S24). Accordingly, the remote connection request receiver 71 of the communication controller 70 receives the participation request (including the pass code) from each of the electronic whiteboards 2*b* and 2*c*, and outputs the pass code to the remote connection processor 81.

Subsequently, the remote connection processor 81 authenticates the pass code received from each of the electronic whiteboards 2*b* and 2*c* using the pass code managed in the pass code manager 810 (Step S25). The remote connection result transmitter 72 then notifies the client unit 20 of each of the electronic whiteboards 2*b* and 2*c* of an authentication result (Steps S26 and S27). When each of the electronic whiteboards 2*b* and 2*c* is determined to be a valid electronic whiteboard through the authentication at Step S25, communication of remote sharing processing is established between the electronic whiteboard 2*a* serving as the host device and the electronic whiteboards 2*b* and 2*c* serving as the participating devices, and the remote participation processor 62 in the client unit 20 of each of the electronic whiteboards 2*b* and 2*c* enables the remote sharing processing to be started between each of the electronic whiteboards and the other electronic whiteboard (Steps S28 and S29).

Display of Output Image

Subsequently, the following describes processing of displaying the output image (C) in the remote sharing processing with reference to FIG. 17.

First, the electronic whiteboard 2*b* displays the output image (C) on the display 3*b* (Step S30). Specifically, the image acquirer 31 of the electronic whiteboard 2*b* receives the data of the output image (C) displayed by the notebook PC 6*b* via the video acquirer 21 from the notebook PC 6*b*, and transmits the data to the display 3*b* via the display superimposition unit 36 and the video superimposition unit 28 to display the output image (C) on the display 3*b*.

Next, when the image processor 30 including the image acquirer 31 of the electronic whiteboard 2*b* transmits the data of the output image (C) to the remote image transmitter 63, the communication controller 60 including the remote image transmitter 63 transmits the data of the output image (C) to the communication controller 70 of the electronic whiteboard 2*a* serving as the host device via the communication network 9 (Step S31). Accordingly, the remote image receiver 73 of the electronic whiteboard 2*a* receives the data of the output image (C) to be output to the remote image processor 82, and the remote image processor 82 stores the data of the output image (C) in the image data storage unit 830.

Next, the electronic whiteboard 2*a* serving as the host device displays the output image (C) on the display 3*a* (Step S32). Specifically, the remote image processor 82 of the electronic whiteboard 2*a* outputs the data of the output image (C) received from the remote image receiver 73 to the remote image transmitter 74. The remote image transmitter 74 outputs the data of the output image (C) to the remote image receiver 64 in the client unit 20 of the same electronic whiteboard 2*a* serving as the host device. The remote image receiver 64 outputs the data of the output image (C) to the display superimposition unit 36. The display superimposition unit 36 outputs the data of the output image (C) to the video superimposition unit 28. The video superimposition unit 28 outputs the data of the output image (C) to the display 3*a*. As a result, the display 3*a* displays the output image (C).

Next, the communication controller 70 including the remote image transmitter 74 in the server unit 90 of the electronic whiteboard 2*a* serving as the host device transmits, via the communication network 9, the data of the output image (C) to the communication controller 60 of the electronic whiteboard 2*c* other than the electronic whiteboard 2*b* that is a transmission source of the data of the output image (C) (Step S33). Consequently, the remote image receiver 64 of the electronic whiteboard 2*c* serving as the participating device receives the data of the output image (C).

Next, the electronic whiteboard 2*c* displays the output image (C) on the display 3*c* (Step S34). Specifically, the remote image receiver 64 of the electronic whiteboard 2*c* outputs the data of the output image (C) received at Step S33 to the display superimposition unit 36 of the electronic whiteboard 2*c*. The display superimposition unit 36 outputs the data of the output image (C) to the video superimposition unit 28. The video superimposition unit 28 outputs the data of the output image (C) to the display 3*c*. As a result, the display 3*c* displays the output image (C).

When pieces of the data of the UI image (A) and the stroke (B) are input to the video superimposition unit 28 in addition to the data of the output image (C), the display superimposition unit 36 generates a superimposition image (A, B, C), and the video superimposition unit 28 outputs data of the superimposition image (A, B, C) to the display 3*c*. When data of a video (E) for a video conference is transmitted from the video conference terminal 7 to the video superimposition unit 28, the video superimposition unit 28 superimposes the data of the video (E) for a video conference on the superimposition image (A, B, C) using the picture-in-picture scheme, and outputs the data to the display 3*c*.

Display of Superimposition Image

Subsequently, the following describes processing of displaying the superimposition image in the remote sharing processing with reference to FIG. 18.

First, the user draws the stroke (B) on the electronic whiteboard 2*b* using the electronic pen 4*b* (Step S41).

Next, as illustrated in FIG. 16, the display superimposition unit 36 of the electronic whiteboard 2*b* superimposes the stroke (B) on the UI image (A) and the output image (C), and the video superimposition unit 28 displays the superimposition image (A, B, C) on the display 3*b* of the electronic whiteboard 2*b* (Step S42).

Specifically, the stroke processor 32 of the electronic whiteboard 2*b* receives the data of the stroke image (B) as the operation data from the coordinate detector 22 and the contact detector 24 via the event recognizer 25, and transmits the data to the display superimposition unit 36. As a result, the display superimposition unit 36 can superimpose the stroke (B) on the UI image (A) and the output image (C), and the video superimposition unit 28 can display the superimposition image (A, B, C) on the display 3*b* of the electronic whiteboard 2*b*.

Next, when the image processor 30 including the stroke processor 32 of the electronic whiteboard 2*b* transmits the data of the stroke (B) to the remote operation transmitter 65, the remote operation transmitter 65 of the electronic whiteboard 2*b* transmits the data of the stroke (B) to the communication controller 70 of the electronic whiteboard 2*a* serving as the host device via the communication network 9 (Step S43). Accordingly, the remote operation receiver 75 of the electronic whiteboard 2*a* receives the data of the stroke (B) to be output to the remote operation processor 83, and the remote operation processor 83 outputs the data of the stroke (B) to the operation synthesis processor 84. In this way, the pieces of data of the stroke (B) rendered in the electronic whiteboard 2*b* are successively transmitted to the remote operation processor 83 of the electronic whiteboard 2*a* serving as the host device every time the stroke is rendered. The data of the stroke (B) is data represented for each stroke data ID illustrated in FIG. 7. Accordingly, for example, as described above, two strokes are required when the user draws the alphabet “T” with the electronic pen 4, so that the pieces of data of the stroke (B) represented by two stroke data IDs are successively transmitted.

Next, the electronic whiteboard 2*a* serving as the host device displays, on the display 3*a*, the superimposition image (A, B, C) including the data of the stroke (B) transmitted from the electronic whiteboard 2*b* (Step S44). Specifically, the operation synthesis processor 84 of the electronic whiteboard 2*a* synthesizes a plurality of pieces of data of the stroke (B) that are successively transmitted via the remote operation processor 83 to be stored in the operation data storage unit 840, and returns the data to the remote operation processor 83. Accordingly, the remote operation processor 83 outputs the synthesized data of the stroke (B) received from the operation synthesis processor 84 to the remote operation transmitter 76. The remote operation transmitter 76 outputs the synthesized data of the stroke (B) to the remote operation receiver 66 in the client unit 20 of the same electronic whiteboard 2*a* serving as the host device. The remote operation receiver 66 outputs the synthesized data of the stroke (B) to the display superimposition unit 36 in the image processor 30. Thus, the display superimposition unit 36 superimposes the synthesized stroke (B) on the UI image (A) and the output image (C). Finally, the video superimposition unit 28 displays the superimposition image (A, B, C) superimposed by the display superimposition unit 36 on the display 3*a*.

Next, the communication controller 70 including the remote operation transmitter 76 in the server unit 90 of the electronic whiteboard 2*a* serving as the host device transmits the synthesized data of the stroke (B) to the communication controller 60 of the electronic whiteboard 2*c* other than the electronic whiteboard 2*b* that is a transmission source of the data of the stroke (B) via the communication network 9 (Step S45). Consequently, the remote operation receiver 66 of the electronic whiteboard 2*c* serving as the participating device receives the synthesized data of the stroke (B).

Subsequently, the electronic whiteboard 2*c* displays the superimposition image (A, B, C) on the display 3*c* (Step S46). Specifically, the remote operation receiver 66 of the electronic whiteboard 2*c* outputs the synthesized data of the stroke (B) received at Step S45 to the image processor 30 of the electronic whiteboard 2*c*. The display superimposition unit 36 of the image processor 30 superimposes the pieces of data of the UI image (A) and the output image (C) on the synthesized data of the stroke (B), and outputs the data of the superimposition image (A, B, C) to the video superimposition unit 28. The video superimposition unit 28 outputs the data of the superimposition image (A, B, C) to the display 3*c*. As a result, the display 3*c* displays the superimposition image (A, B, C).

In the above processing, the output image (C) is displayed on the display 3. Alternatively, the background image (D) may be displayed in place of the output image (C). Instead of an exclusive relation between the output image (C) and the background image (D), both of the output image (C) and the background image (D) may be displayed on the display 3 at the same time.

Termination of Participation

Subsequently, the following describes processing through which the participating device ends the participation in the remote sharing processing with reference to FIG. 18. The embodiment illustrated in FIG. 18 describes processing through which the electronic whiteboard 2*c* ends the participation.

First, when the electronic whiteboard 2*c* receives a request for ending the participation through an operation of the input device such as a touch panel by the user, the remote participation processor 62 makes a request for ending the participation to the communication controller 70 in the server unit 90 of the electronic whiteboard 2*a* serving as the host device (Step S47). Accordingly, the remote connection request receiver 71 of the communication controller 70 receives the request for ending the participation from the electronic whiteboard 2*c*, and outputs the request for ending the participation to the remote connection processor 81 together with the IP address of the electronic whiteboard 2*c*. The remote connection processor 81 of the electronic whiteboard 2*a* then deletes, from the participation site management table 820, the IP address of the electronic whiteboard 2*c* that makes the request for ending the participation and the name of the site at which the electronic whiteboard 2*c* is arranged based on the IP address transmitted from the remote connection request receiver 71, and outputs the IP address of the electronic whiteboard 2*c* and a notification that the IP address is deleted to the remote connection result transmitter 72.

Next, the communication controller 70 including the remote connection result transmitter 72 instructs the communication controller 60 in the client unit 20 of the electronic whiteboard 2*c* to end the participation via the communication network 9 (Step S48). Consequently, the remote participation processor 62 of the communication controller 60 in the electronic whiteboard 2*c* disconnect the communication of the remote sharing processing to perform processing for ending the participation, so that the participation is ended (Step S49).

The following describes the embodiment of the present invention. The embodiment includes the following characteristics in processing of storing information in an electronic information board.

The embodiment has the following configuration for storing the emblem image rendered on the electronic whiteboard in a general-purpose file format to be utilized and reading and editing the emblem image again.

That is, the image processing device according to the embodiment includes a handwriting image renderer configured to draw the stroke on a first layer, an emblem image renderer configured to render the emblem image representing a character, a symbol, a figure, or a combination thereof on a second layer lower than the first layer, and an external image renderer configured to draw an external image that is externally acquired on a third layer lower than the second layer. The image processing device according to the embodiment also includes a serialization unit configured to serialize the stroke rendered on the first layer, the emblem image rendered on the second layer, and the external image rendered on the third layer to be converted into data in a text format, and a document creator configured to create document data corresponding to one page based on the data in a text format converted by the serialization unit.

With the configuration described above, the emblem image rendered on the electronic whiteboard can be stored in a general-purpose file format to be utilized, and the emblem image can be read to be edited again.

The characteristics of the embodiment will be described below in detail with reference to the drawings.

Figure 19:
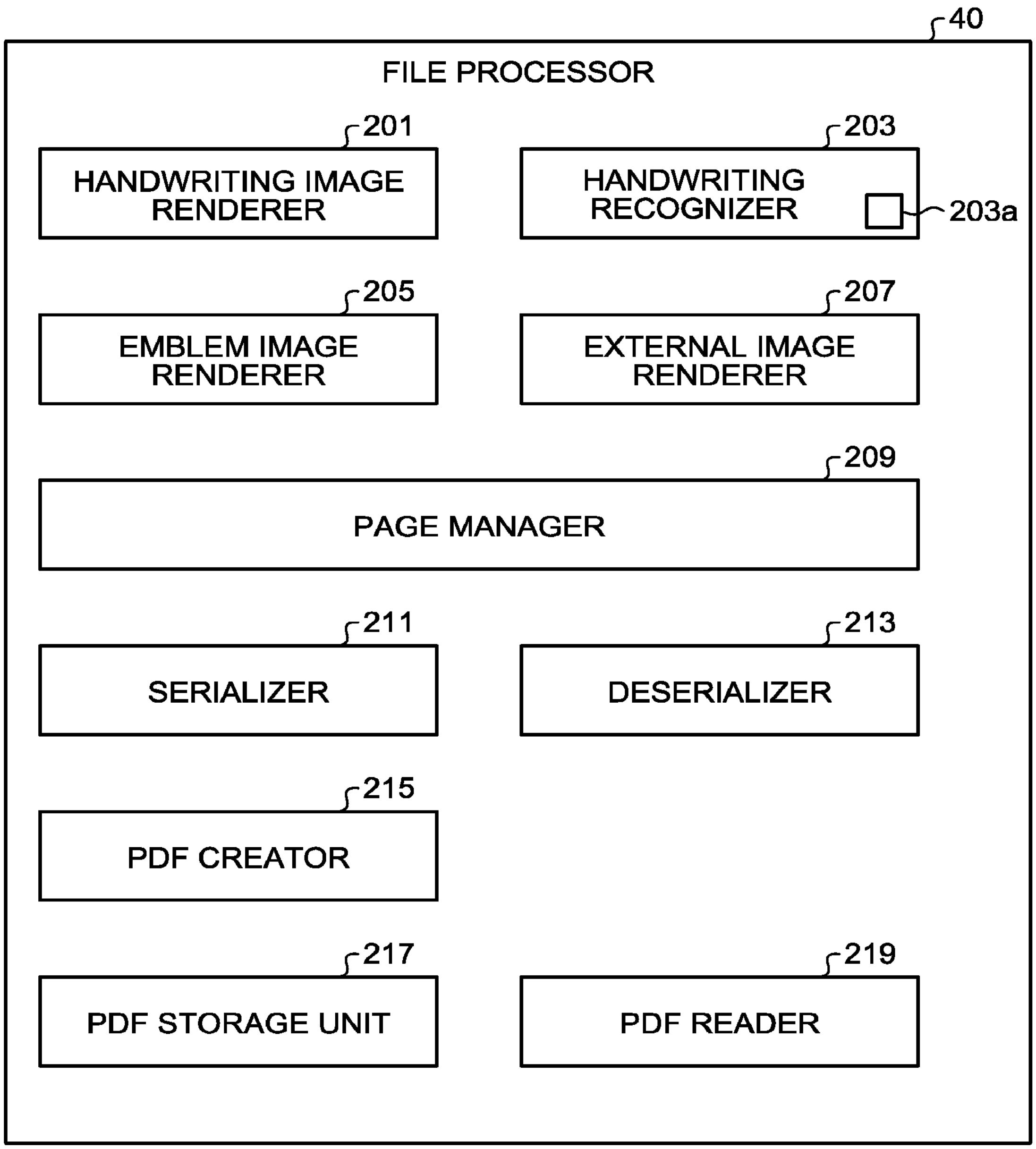
FIG. 19 is a detailed functional block diagram of the file processor illustrated in FIG. 3.

With reference to FIG. 19, the following describes a detailed functional block diagram of the file processor 40 illustrated in FIG. 3

As illustrated in FIG. 19, the file processor 40 includes a handwriting image renderer 201, a handwriting recognizer 203, an emblem image renderer 205, an external image renderer 207, a page manager 209, a serializer 211, a deserializer 213, a PDF creator 215, a PDF storage unit 217, and a PDF reader 219.

The handwriting image renderer 201 renders a handwriting stroke (information) acquired from the stroke processor 32 on a stroke layer (A).

The handwriting recognizer 203 performs character recognition from a character image formed by the stroke rendered on the stroke layer (A) described later using a known character recognition technique. The handwriting recognizer 203 performs character recognition of the handwriting character image to acquire character information such as a character code, a character code type, a size of the character image, and a display position of the character image, and generates a character list including a plurality of pieces of character information as a result of performing character recognition of a plurality of characters.

The emblem image renderer 205 renders the emblem image such as a character, a figure, a line, a square, and a circle on an emblem layer (B) described later. That is, the emblem image renderer 205 renders the emblem image representing a character, a symbol, a figure, or a combination thereof on the emblem layer (B) (second layer) lower than the stroke layer (A).

The external image renderer 207 renders a JPEG image, a scalable vector graphics (SVG) image, and the like on an external image layer (C).

The page manager 209 holds a list of the page data, and performs processing for adding or deleting the page.

The serializer 211 serializes the page data to be converted into a text format. As the text format, used are extensible markup language (XML), JavaScript (registered trademark) Object Notation (JSON), and the like.

Serialization processing is processing for converting a plurality of objects that are referred to during execution of one computer program into a data format that can be transferred to the other computer program. By performing serialization processing, a plurality of objects can be converted into a data format that can be filed. Deserialization processing means inverse conversion of such serialization.

The PDF storage unit 217 stores the information rendered on the page (page data). In storing the information, the PDF storage unit 217 serializes the page data to be converted into a text format using the serializer 211.

The PDF creator 215 creates a PDF document using the serialized data, and draws the handwriting stroke and the emblem image on a page of the PDF document. The PDF creator 215 compresses the serialized data using compression processing software such as ZIP, and embeds the data in the page to be stored as a PDF document in the USB memory 5 (FIG. 3).

The deserializer 213 restores the data that is converted into a unique format through the serialization processing and stored in the file to an original data format.

The PDF reader 219 determines whether the PDF document acquired from the USB memory 5 (FIG. 3) is the PDF document created by the PDF creator 215 based on PDF bibliographic information added to the acquired PDF document. If the document is the PDF document, the PDF reader 219 extracts the external image attached to the page, and extracts the compressed serialized data embedded in the page to be decompressed. The PDF reader 219 also deserializes the serialized data to be serialized and restored to the original data format, and creates the page to be added to the page manager 209.

Subsequently, with reference to FIG. 20, the following describes a layer configuration of a general-purpose file. In the embodiment, the layer configuration illustrated in FIG. 20 may be used in place of the layer configuration of the general-purpose file illustrated in FIG. 16.

The PDF document includes, from an upper layer toward a lower layer, the stroke layer (A), the emblem layer (B), and the external image layer (C) in this order.

The stroke layer (A) is a layer for drawing the handwriting stroke. The stroke layer (A) is arranged on a frontmost surface to enhance the handwriting image.

The emblem layer (B) is a layer for drawing a character, a symbol, and a figure that are recognized to be handwritten, a character input in a text box, and a figure (such as a line, a circle, a square, and a triangle) selected with a tool bar and the like.

The external image layer (C) is a layer for displaying a PC screen captured from the notebook PC 6 illustrated in FIG. 3 via the video acquirer 21 and the image acquirer 31 at the center as an external image.

The same layer configuration is also applied to the page on a whiteboard side.

Figure 21:
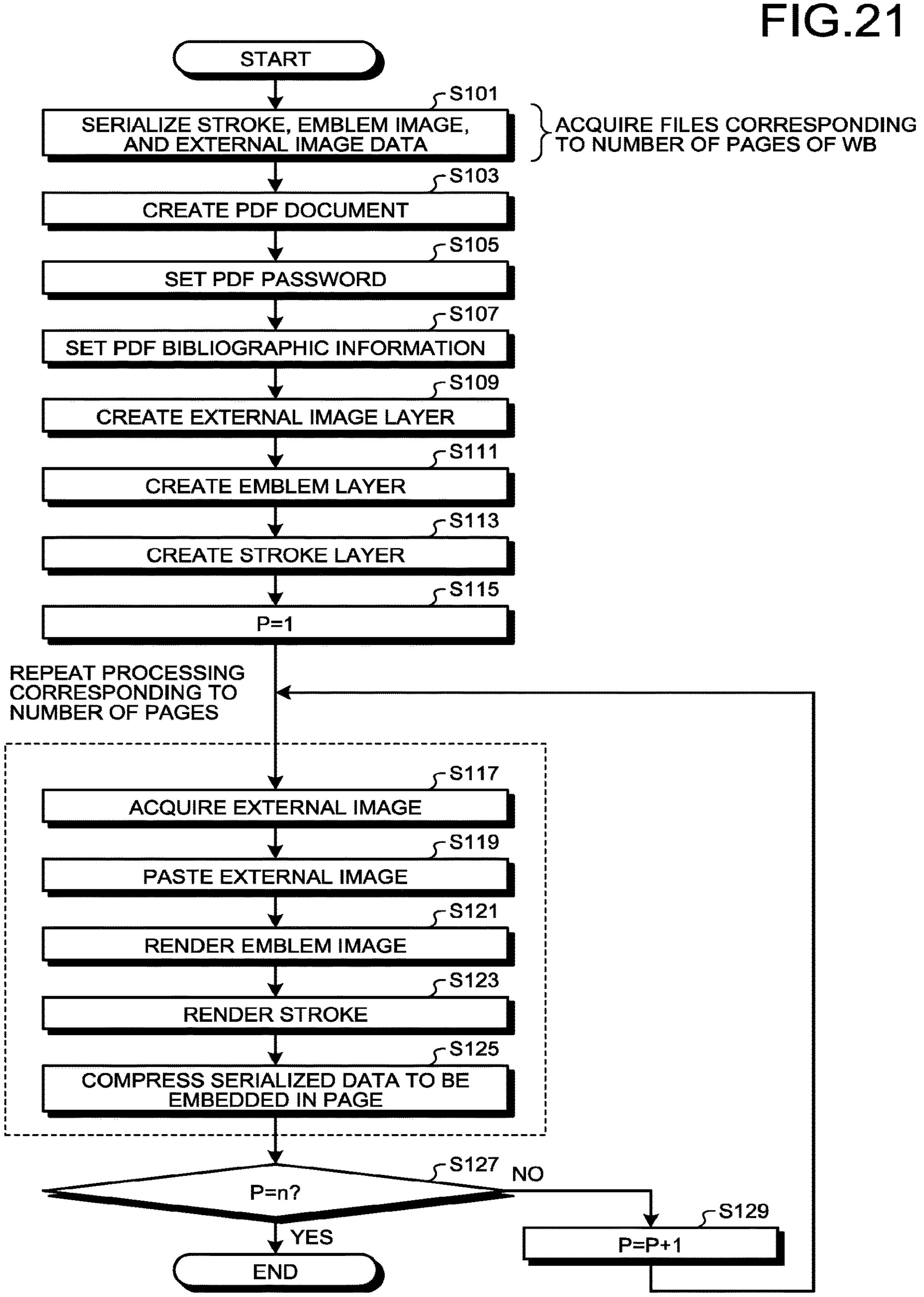
FIG. 21 is a storage flowchart illustrating an operation of a PDF creator according to the embodiment of the present invention.

Subsequently, with reference to FIG. 21, the following describes a storage procedure representing an operation of the PDF creator 215 according to the embodiment of the present invention.

In storing the information of the electronic whiteboard 2 (electronic whiteboard data), the serializer 211 first serializes each piece of data including the stroke, the emblem image, and the external image for each page. The serializer 211 converts the page information into the JSON format. The format to be adopted depends on implementation.

The serialized data in a text format such as the XML and the JSON is output to the PDF creator 215 (S101).

Figure 20:
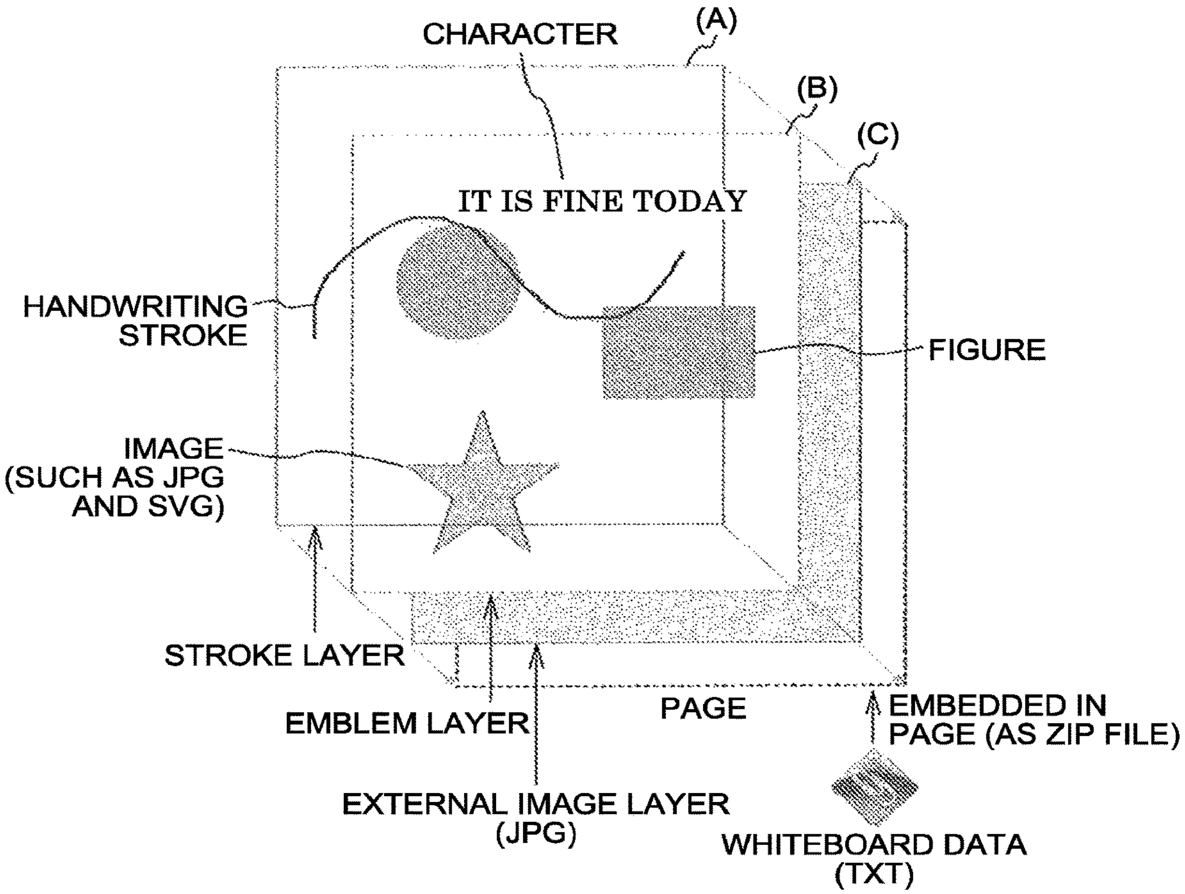
FIG. 20 is a configuration diagram of the image layers.

This text file is compressed with ZIP and embedded in the page of the PDF document (refer to FIG. 20). The PDF creator 215 acquires files corresponding to the number of pages of the electronic whiteboard 2.

The serialized data output from the serializer 211 is passed to the PDF creator 215 together with the bibliographic information and a password set to the PDF document. The password is passed thereto only when necessary.

The PDF creator 215 creates the PDF document (S103).

The PDF creator 215 sets a PDF password to the PDF document (S105), sets the PDF bibliographic information (S107), and creates the external image layer (C) (S109). The PDF creator 215 also creates the emblem layer (B) (S111), and creates the stroke layer (A) (S113).

Subsequently, the PDF creator 215 sets a page number P=1 to the memory as a processing number (S115).

The PDF creator 215 then reads the external image of the notebook PC 6 and a file of Microsoft PowerPoint (registered trademark) and the like from the USB memory 5, and acquires an image obtained by imaging the file (S117).

Next, the PDF creator 215 pastes the acquired external image to the external image layer (C) (S119).

The PDF creator 215 then renders the emblem image on the emblem layer (B) according to the serialized data (S121).

Similarly, the PDF creator 215 renders the stroke on the stroke layer (A) according to the serialized data (S123).

The PDF creator 215 also compresses the serialized data with ZIP and the like to be embedded in the page, and stores the data in the USB memory 5 (FIG. 3) as the PDF document (S125).

Subsequently, the PDF creator 215 determines whether the page number P=n is satisfied as the processing number set to the memory (S127). In this case, if the page number P=n is satisfied, the PDF creator 215 ends the processing. On the other hand, if the page number P=n is not reached, the process proceeds to Step S129.

At Step S129, the PDF creator 215 sets the page number P=P+1 (increment) to the memory as the processing number, and the process returns to Step S117.

In this way, the stroke, the emblem image, the external image, and the like are serialized to be converted into the data in a text format, and the document data corresponding to one page is created based on the converted data in a text format. Accordingly, the emblem image rendered on the electronic whiteboard can be stored in a general-purpose file format to be utilized, and the emblem image can be read to be edited again.

By creating the PDF document as the document data, the emblem image rendered on the electronic whiteboard can be stored in a general-purpose file format to be utilized, and the emblem image can be read to be edited again.

Figure 22:
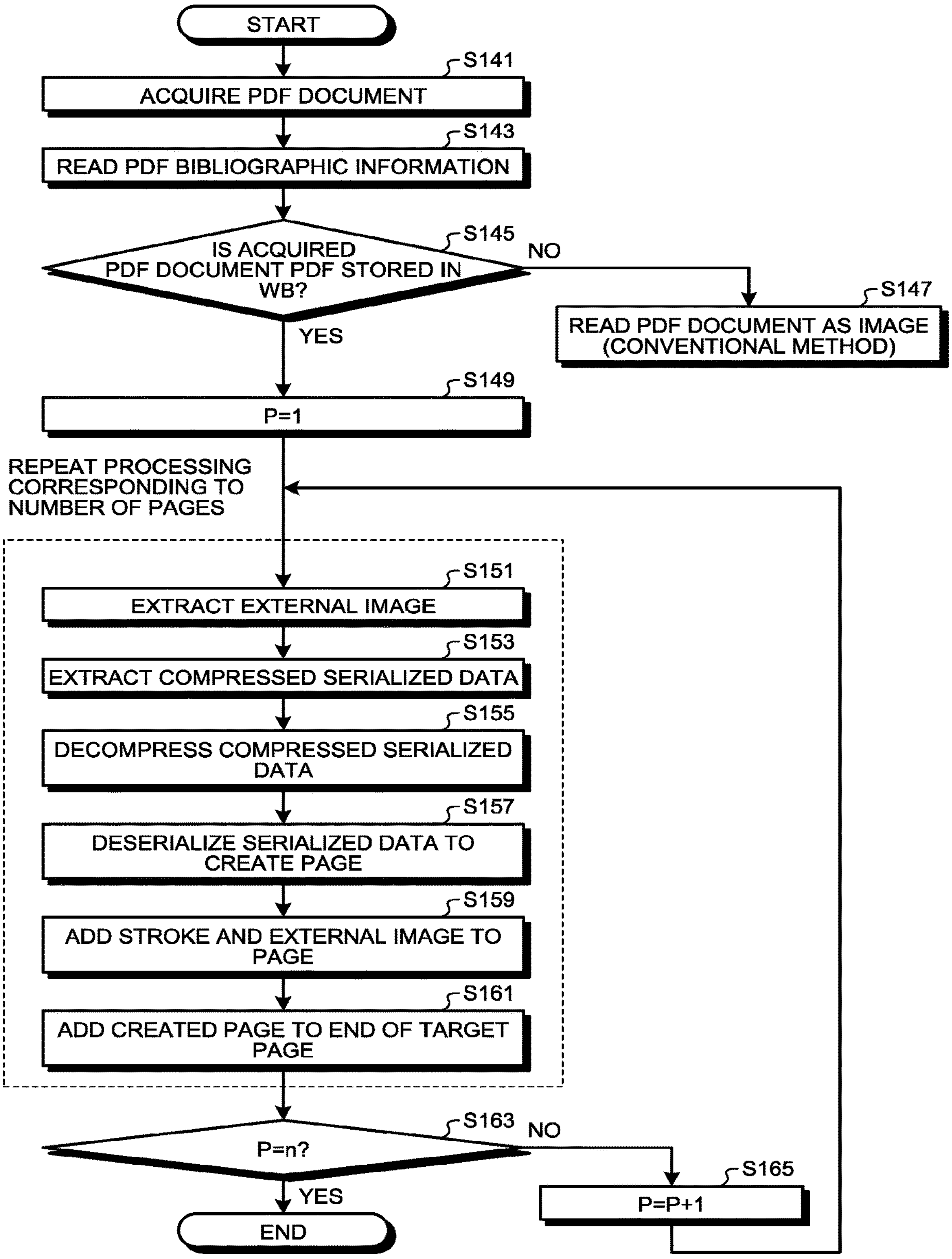
FIG. 22 is a reading flowchart illustrating an operation of a PDF reader according to the embodiment of the present invention.

Subsequently, with reference to FIG. 22, the following describes a reading procedure representing an operation of the PDF reader 219 according to the embodiment of the present invention.

First, the PDF reader 219 acquires the PDF document from the USB memory 5 (FIG. 3) (S141), and reads the PDF bibliographic information added to the PDF document (S143). The PDF reader 219 determines whether the acquired PDF document is the PDF document created by the PDF creator 215 using the method described above based on the read PDF bibliographic information (S145). If the acquired PDF document is the PDF document created by the PDF creator 215 using the method described above, the process proceeds to S149. On the other hand, if the acquired PDF document is not the PDF document created by the PDF creator 215 using the method described above, the process proceeds to S147.

If the acquired PDF document is not the PDF document created using the above method (No at S145), the PDF reader 219 reads the PDF document as an image (S147).

On the other hand, if the acquired PDF document is the PDF document created using the above method (Yes at S145), the PDF reader 219 sets the page number P=1 as the processing number to the memory (S149).

Subsequently, the PDF reader 219 extracts the external image attached to the page (S151), and extracts the compressed serialized data embedded in the page (S153).

Next, the PDF reader 219 decompresses the compressed serialized data (S155).

The PDF reader 219 then serializes and restores the serialized data using the deserializer 213 to be restored to the original data format, and creates the page (S157).

That is, the deserializer 213 first [1] extracts a ZIP file from the PDF file. As a result, ZIP files corresponding to the number of pages are extracted. Next, the deserializer 213 [2] decompresses the ZIP file to acquire a text file. The deserializer 213 then [3] deserializes information in the text file to create a page object. The deserializer 213 then [4] adds the page object to the page manager 209. Subsequently, the deserializer 213 [5] performs the pieces of processing described in [2] to [4] corresponding to the number of pages.

The PDF reader 219 then adds the stroke and the external image extracted at Step S151 to the restored page (S159).

Next, the PDF reader 219 adds the created page to the end of the target page (S161). In this way, when the page object is added, the page object is added to the end of a page list.

Subsequently, the PDF reader 219 determines whether the page number P=n is satisfied as the processing number set to the memory (S163). In this case, if the page number P=n is satisfied, the PDF reader 219 ends the processing. On the other hand, if the page number P=n is not reached, the process proceeds to Step S165.

At Step S165, the PDF reader 219 sets the page number P=P+1 (increment) to the memory as the processing number, and the process returns to Step S151.

In this way, one page is serialized and restored from the data in a text format in the document data, so that the emblem image rendered on the electronic whiteboard can be stored in a general-purpose file format to be utilized, and the emblem image can be read to be edited again.

Figure 23:
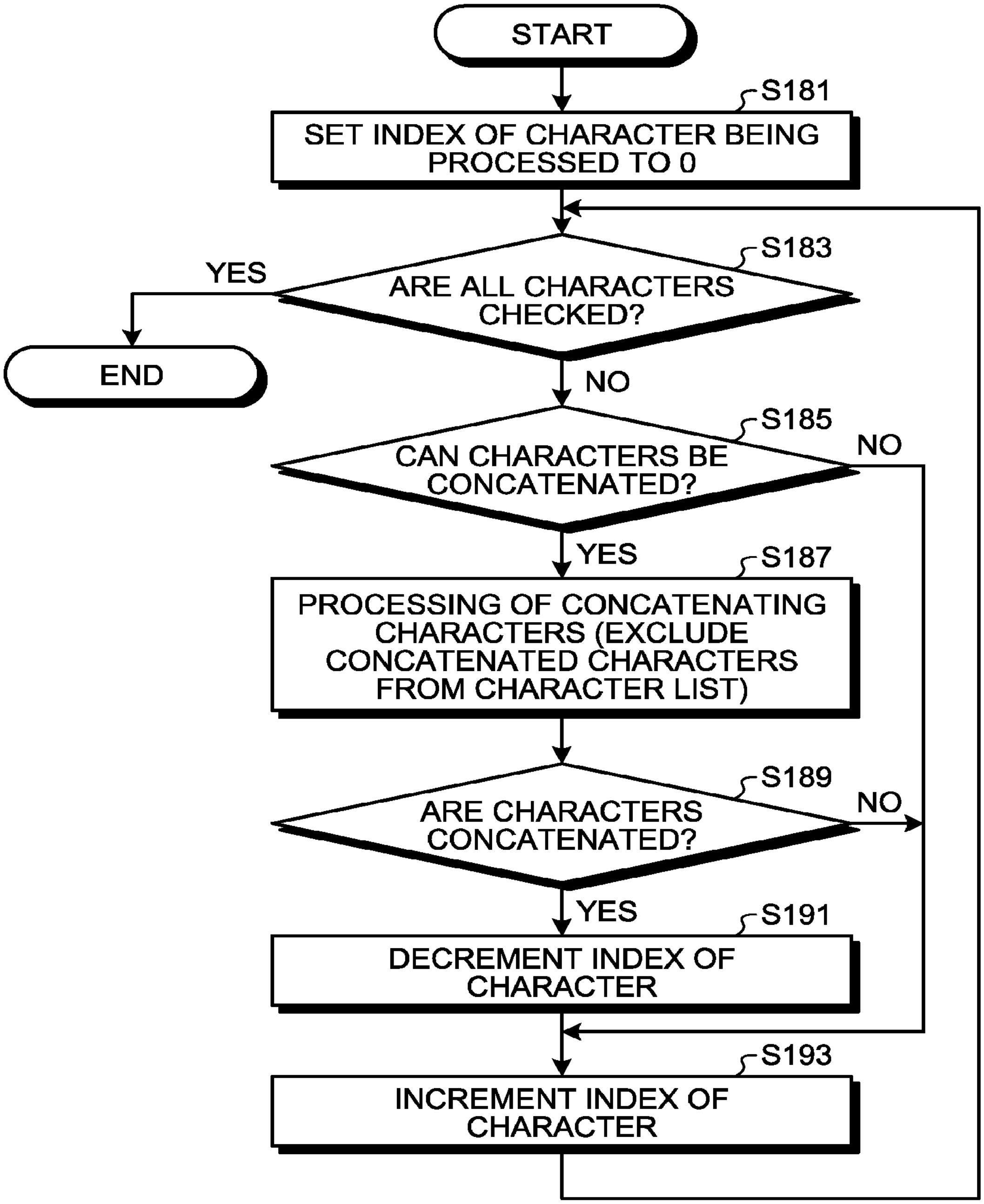
FIG. 23 is a character concatenation flowchart illustrating an operation of a character concatenation unit.

Next, with reference to FIG. 23, the following describes a character concatenation procedure representing an operation of a character concatenation unit 203*a*.

The handwriting recognizer 203 illustrated in FIG. 19 includes the character concatenation unit 203*a*. Regarding the character information recognized by the handwriting recognizer 203, the character concatenation unit 203*a* performs character concatenation on a part where characters can be concatenated.

The character list generated by the handwriting recognizer 203 includes a plurality of pieces of character information as described above, and each piece of character information includes pieces of information such as a font name, a font size, a locale, a color, a creation date, and a position and a size of a character display region. On the other hand, when strokes corresponding to two characters are input, for example, an en space may be inserted therebetween. As a result of the character recognition, the character code recognized as at least one en space may be included. When an em space is input, it is highly possible that the user has intentionally written the em space, so that the em space is not deleted in this processing.

In the embodiment, such an en space is deleted and the pieces of character information are concatenated to obtain legible document information.

First, the character concatenation unit 203*a* sets, to the memory, an index number=0 of the character information under processing included in the character list described above (S181).

Next, the character concatenation unit 203*a* determines whether all the pieces of character information are examined (S183). In this case, if all the pieces of character information are examined, the character concatenation unit 203*a* ends the processing. On the other hand, if not all the pieces of character information are examined, the process proceeds to S185.

For each piece of character information corresponding to one character, the character concatenation unit 203*a* checks whether the piece of character information can be concatenated to an adjacent piece of character information (S185). At Step S185, the character concatenation unit 203*a* determines whether there is a piece of character information represented by the en space. If there is the en space, the character concatenation unit 203*a* determines that the characters can be concatenated, and deletes the en space between adjacent pieces of character information to concatenate the characters. By recursively performing connection processing, the positions of the adjacent pieces of character information can be concatenated (S187). The en space that is deleted when the characters are concatenated is deleted from the character list.

The character concatenation unit 203*a* determines whether the pieces of character information are concatenated (S189).

When the pieces of character information are concatenated, the character concatenation unit 203*a* decrements the index number of the character information under examination by one (−1) (S191). Subsequently, the process proceeds to Step S193. The character concatenation unit 203*a* increments the index number of the character information under examination by one (+1) (S193), returns the process to Step S183, and repeats the processing described above until all the pieces of character information in the character list are checked.

In this way, character recognition processing is performed on the character image represented by the stroke to acquire a character string of the character information, and when there is an unnecessary space between the adjacent pieces of character information on the acquired character string, the space is deleted so as to concatenate the adjacent pieces of character information, and the character string is output. Accordingly, the character recognized from the stroke can be edited.

The character recognized from the stroke can be rendered on the emblem image layer (B).

Subsequently, the following describes the character concatenation in a Japanese sentence with reference to FIG. 24.

The character recognized by the handwriting recognizer 203 is managed in units of a character in the electronic whiteboard 2 to cope with processing of deleting or moving only one character.

However, when it is managed as a document, one character does not make sense, so that the adjacent pieces of character information are concatenated to be the character string, which is easily managed. This concatenation facilitates character string retrieval and the like. In storing the character information in a PDF document, the pieces of character information may be concatenated to be rendered as the character string to improve retrieval accuracy.

In concatenating the characters, whether pieces of information including the font name, the font size, the color, the height, an em or an en, the locale (such as ja JP, en US, and de DE) of the adjacent characters are common is checked, and a group of characters including the common pieces of information is integrated as the character string.

A phrase "the pieces of character information are adjacent to each other" means that any one of upper, lower, left, and right sides of one character is brought into contact with any one of the upper, lower, left, and right sides of the next character. As a result of character concatenation, in the example illustrated in (B) in FIG. 24, "モジュールAの担当者は鈴木さんです。" is one character string.

Figure 24:
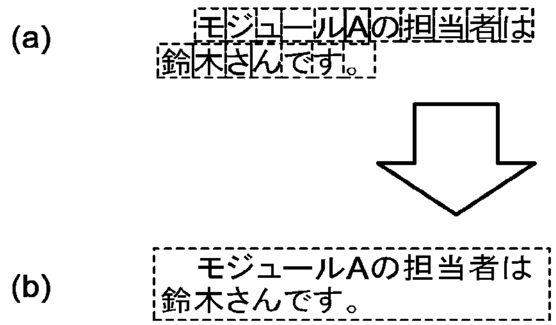
FIG. 24 illustrates an example of character concatenation in a Japanese sentence.

In this case, there is an indent (indentation) corresponding to one character at the beginning of the character string illustrated in (A) in FIG. 24. To express the indent, as illustrated in (B) in FIG. 24, two en spaces are inserted to the beginning of the character string. The number of en spaces to be inserted can be calculated from the position of the first character and the position of a text box storing the concatenated character string.

Figure 25:
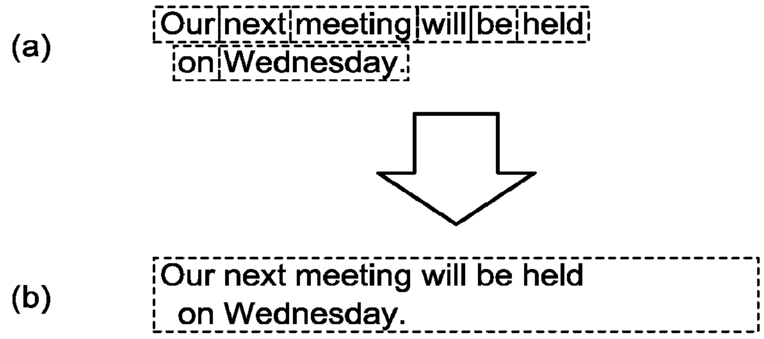
FIG. 25 illustrates an example of character concatenation in an English sentence.

Subsequently, the following describes the character concatenation in an English sentence with reference to FIG. 25.

The characters are also concatenated in the English document similarly to the Japanese sentence described above. The English sentence recognized to be handwritten by the handwriting recognizer 203 is managed in units of a word in the electronic whiteboard 2. As illustrated in FIG. 25A, if a space after a word is assumed to be part of the word, the characters can be concatenated as illustrated in FIG. 25B similarly to the character concatenation in the Japanese sentence.

As a result, a performance of the character string retrieval in the document can be enhanced.

According to the embodiment, the handwriting stroke, the character, the figure, and the image are converted into a text format, and rendered in the general-purpose file based on the text information. In this case, adjacent characters are rendered as a concatenated character string. Then processing of embedding the text in the page is performed, so that the handwriting stroke, the emblem image recognized to be handwritten, and the attached external image are stored in the general-purpose file, and the characters in the document can be retrieved. The file can be read to be edited again.

Configuration, Function, Effect of Aspects of Embodiment

First Aspect

The electronic whiteboard 2 according to the aspect includes the handwriting image renderer 201 configured to render the stroke on the stroke layer (A) (first layer), the emblem image renderer 205 configured to render the emblem image representing a character, a symbol, a figure, or a combination thereof on the emblem layer (B) (second layer) lower than the stroke layer (A), and the external image renderer 207 configured to render a background image that is externally acquired on the external image layer (C) (third layer) lower than the emblem layer (B). The electronic whiteboard 2 also includes a serializer (serialization unit) 211 configured to serialize the stroke rendered on the stroke layer (A), the emblem image rendered on the emblem layer (B), and the background image rendered on the external image layer (C) to be converted into data in a text format, and the PDF creator (document creator) 215 configured to create document data corresponding to one page based on the data in a text format converted by the serializer 211.

According to the aspect, the stroke, the emblem image, and the external image are serialized to be converted into the data in a text format, and the document data corresponding to one page is created based on the converted data in a text format, so that the emblem image rendered on the electronic whiteboard can be stored in a general-purpose file format to be utilized, and the emblem image can be read to be edited again.

Second Aspect

The electronic whiteboard 2 according to the aspect includes the deserializer 213 that serializes and restores one page from the data in a text format in the document data.

According to the aspect, one page is serialized and restored from the data in a text format in the document data, so that the emblem image rendered on the electronic whiteboard can be stored in a general-purpose file format to be utilized, and the emblem image can be read to be edited again.

Third Aspect

The PDF creator 215 according to the aspect creates a PDF document as document data.

According to the aspect, the PDF document is created as the document data, so that the emblem image rendered on the electronic whiteboard can be stored in a general-purpose file format to be utilized, and the emblem image can be read to be edited again.

Fourth Aspect

The electronic whiteboard 2 according to the aspect includes the handwriting recognizer 203 configured to perform character recognition processing on the character image represented by the stroke to acquire a character string of character information, and the character concatenation unit 203*a* that deletes, when there is an unnecessary space between adjacent pieces of character information on the character string acquired by the handwriting recognizer 203, the space so as to concatenate the adjacent pieces of character information, and outputs the character string.

According to the aspect, character recognition processing is performed on the character image represented by the stroke to acquire the character string of the character information, and when there is an unnecessary space between the adjacent pieces of character information on the acquired character string, the space is deleted so as to concatenate the adjacent pieces of character information, and the character string is output.

Accordingly, the character recognized from the stroke can be edited.

Fifth Aspect

The emblem image renderer 205 according to the aspect draws the character string concatenated by the character concatenation unit 203*a* on the emblem layer (B) (second layer).

According to the aspect, the character recognized from the stroke can be rendered on the emblem layer (B).

Sixth Aspect

The image processing method according to the aspect is performed with the electronic whiteboard 2 according to any one of the first aspect to the fifth aspect, and includes a serialization step (S101) for serializing the stroke rendered on the stroke layer (A) (first layer), the emblem image rendered on the emblem layer (B) (second layer), and the external image rendered on the external image layer (C) (third layer) to be converted into the data in a text format, and a document creation step (S103) for creating the document data corresponding to one page based on the data in a text format converted at the serialization step.

According to the aspect, the stroke, the emblem image, and the external image are serialized to be converted into the data in a text format, and the document data corresponding to one page is created based on the converted data in a text format, so that the emblem image rendered on the electronic whiteboard can be stored in a general-purpose file format to be utilized, and the emblem image can be read to be edited again.

Seventh Aspect

The computer program according to the aspect, which may be stored in a computer-readable storage medium, causes a processor to perform each of the steps described in the sixth aspect.

According to the aspect, each of the steps can be performed by the processor.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image processing device, comprising:

processing circuitry configured to:

render a stroke image on a first layer;

render an emblem image representing at least one of a character, a symbol, and a figure on a second layer lower than the first layer;

render an external image that is externally acquired on a third layer lower than the second layer;

automatically serialize and convert all of the stroke image rendered on the first layer, the emblem image rendered on the second layer, and the external image rendered on the third layer into data in a scripting language object notation (SLON), the automatic serialization and conversion into the data in the SLON being separate from a character recognition process on the stroke image;

automatically compress all of the data in the serialized SLON to create and store a portable document format (PDF) file; and read the stored PDF file, extract the compressed data, decompress the compressed data to generate decompressed data in the SLON, deserialize the decompressed data, and render the emblem image.

2. The image processing device of claim 1, wherein the processing circuitry is further configured to:

attach bibliographic information to the PDF file, the bibliographic information indicating that the PDF file was created in the SLON;

determine, when reading the PDF file and based on the bibliographic information attached to the PDF file, whether the PDF file was created in the SLON; and read the PDF file as an image when determining that the PDF file was not created in the SLON.

3. The image processing device of claim 1, wherein the processing circuitry is further configured to:

perform the character recognition process on a character string image represented by the stroke image to acquire a character string from the character string image;

determine whether adjacent characters in the acquired character string have common character information; and concatenate the adjacent characters when determining that the adjacent characters have the common character information.

4. The image processing device according to claim 3, wherein the processing circuitry is further configured to render the concatenated character string on the second layer.

5. The image processing device according to claim 3, wherein the processing circuitry is further configured to determine the adjacent characters based on whether any one of upper, lower, left, and right sides of one character is brought into contact with any one of upper, lower, left, and right sides of a next character.

6. The image processing device of claim 3, wherein the processing circuitry is further configured to determine whether the adjacent characters in the acquired character string have any of a common font name, a common font size, and a common color.

7. The image processing device of claim 3, wherein the processing circuitry is further configured to:

determine whether an en space exists between the adjacent characters; and delete, when determining that the en space exists between the adjacent characters, the en space before concatenating the adjacent characters.

8. An image processing method, the method comprising:

automatically serializing and converting all of a stroke image rendered on a first layer, an emblem image rendered on a second layer lower than the first layer, and an external image rendered on a third layer lower than the second layer into data in a scripting language object notation (SLON), the automatic serialization and conversion into the data in the SLON being separate from a character recognition process on the stroke image;

automatically compressing all of the data in the serialized SLON to create and store a portable document format (PDF) file; and reading the stored PDF file, extracting the compressed data, decompressing the compressed data to generate decompressed data in the SLON, deserializing the decompressed data, and rendering the emblem image.

9. The image processing method of claim 8, further comprising:

attaching bibliographic information to the PDF file, the bibliographic information indicating that the PDF file was created in the SLON;

determining, when reading the PDF file and based on the bibliographic information attached to the PDF file, whether the PDF file was created in the SLON; and reading the PDF file as an image when determining that the PDF file was not created in the SLON.

10. The image processing method of claim 8, further comprising:

performing the character recognition process on a character string image represented by the stroke image to acquire a character string from the character string image;

determining whether adjacent characters in the acquired character string have common character information; and concatenating the adjacent characters when determining that the adjacent characters have the common character information.

11. The image processing method of claim 10, further comprising:

attaching bibliographic information to the PDF file, the bibliographic information indicating that the PDF file was created in the SLON;

determining, when reading the PDF file and based on the bibliographic information attached to the PDF file, whether the PDF file was created in the SLON; and reading the PDF file as an image when determining that the PDF file was not created in the SLON.

12. The image processing method of claim 10, further comprising:

rendering the concatenated character string on the second layer.

13. The image processing method of claim 10, further comprising:

determining the adjacent characters based on whether any one of upper, lower, left, and right sides of one character is brought into contact with any one of upper, lower, left, and right sides of a next character.

14. The image processing method of claim 10, further comprising:

determining whether the adjacent characters in the acquired character string have any of a common font name, a common font size, and a common color.

15. The image processing method of claim 10, further comprising:

determining whether an en space exists between the adjacent characters; and deleting, when determining that the en space exists between the adjacent characters, the en space before concatenating the adjacent characters.

16. A non-transitory computer-readable storage medium with an executable program stored thereon, wherein the program instructs a computer to perform the image processing method according to claim 8.

17. An image processing device, comprising:

processing circuitry configured to:

render a stroke image;

render an emblem image representing at least one of a character, a symbol, and a figure;

render an external image;

automatically serialize and convert all of the stroke image, the emblem image and the external image into data in a scripting language object notation (SLON);

automatically compress all of the data in the serialized SLON to create and store a portable document format (PDF) file; and read the stored PDF file, extract the compressed data, decompress the compressed data to generate decompressed data in the SLON, deserialize the decompressed data, and render the emblem image.

18. The image processing device of claim 17, wherein the processing circuitry is further configured to perform a character recognition process on a character string image of the stroke image to acquire a character string corresponding to the stroke image.

19. The image processing device of claim 18, wherein the processing circuitry is further configured to:

determine whether adjacent characters in the character string have common character information; and concatenate the adjacent characters when determining that the adjacent characters have the common character information.

20. The image processing device of claim 17, wherein the processing circuitry is further configured to:

attach bibliographic information to the PDF file, the bibliographic information indicating that the PDF file was created in the SLON;

determine, when reading the PDF file and based on the bibliographic information attached to the PDF file, whether the PDF file was created in the SLON; and read the PDF file as an image when determining that the PDF file was not created in the SLON.

* * * * *